(12) United States Patent
Harada et al.

(10) Patent No.: US 10,345,328 B2
(45) Date of Patent: Jul. 9, 2019

(54) WIND DIRECTION METER, WIND DIRECTION/FLOW METER, AND MOVEMENT DIRECTION METER

(71) Applicant: DENSO CORPORATION, Kariya, Aichi-pref. (JP)

(72) Inventors: Toshikazu Harada, Kariya (JP); Atusi Sakaida, Kariya (JP); Toshihisa Taniguchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 119 days.

(21) Appl. No.: 15/315,782

(22) PCT Filed: May 11, 2015

(86) PCT No.: PCT/JP2015/063498
§ 371 (c)(1),
(2) Date: Dec. 2, 2016

(87) PCT Pub. No.: WO2015/186476
PCT Pub. Date: Dec. 10, 2015

(65) Prior Publication Data
US 2017/0108527 A1    Apr. 20, 2017

(30) Foreign Application Priority Data

Jun. 3, 2014 (JP) .................................. 2014-114824
Apr. 16, 2015 (JP) .................................. 2015-084450

(51) Int. Cl.
*G01P 5/12* (2006.01)
*G01P 13/00* (2006.01)
(Continued)

(52) U.S. Cl.
CPC .............. *G01P 13/006* (2013.01); *G01P 5/10* (2013.01); *G01P 5/12* (2013.01); *G01P 13/02* (2013.01)

(58) Field of Classification Search
None
See application file for complete search history.

(56) References Cited

U.S. PATENT DOCUMENTS 4,121,088 A  * 10/1978  Doremus ............... B64D 15/16
                                                       219/201
4,986,122 A  *  1/1991  Gust ....................... E21B 21/08
                                                        73/1.29
(Continued)

FOREIGN PATENT DOCUMENTS

DE    10 2007 034321 A1    1/2009
JP         H05092741 U    12/1993
(Continued)

OTHER PUBLICATIONS

Anonymous, "Implementing Cold-Junction Compensation in Thermocouple Applications", maxim integrated, application note 4026, Apr. 26, 2007, XP055414610.

*Primary Examiner* — Jill E Culler
(74) *Attorney, Agent, or Firm* — Harness, Dickey & Pierce, P.L.C.

(57) ABSTRACT

A wind direction meter has the following plurality of sensors and a control unit. Each sensor has a first surface and has first and second interlayer connection members made of different metals or semiconductors. Further, the wind direction meter includes a thermoelectric conversion element which generates an electrical output when a temperature difference occurs between first ends and second ends of the respective first and second interlayer connection members. The sensor generates an electric output when the surrounding air, whose temperature has been changed by a heater, is moved by the wind to produce a temperature difference between the first ends and the second ends of the first and second interlayer connection members. The control unit calculates the direction of the wind on the basis of the difference in output. Thus, the wind direction of a weak wind can be detected with the wind direction meter.

7 Claims, 24 Drawing Sheets

(51) Int. Cl.
    *G01P 13/02*    (2006.01)
    *G01P 5/10*     (2006.01)

(56)            References Cited

U.S. PATENT DOCUMENTS 6,631,638 B2 *  10/2003  James .................... G01F 1/6845
                                                              73/204.26
 2007/0261824 A1 *  11/2007  Saegusa ................ G01P 13/006
                                                              165/129
 2010/0186496 A1 *   7/2010  Galley ................. G01P 13/006
                                                              73/170.06
 2014/0007669 A1     1/2014  Akada
 2015/0041451 A1 *   2/2015  Kriwan ................ G01P 13/006
                                                              219/201

FOREIGN PATENT DOCUMENTS

JP         H07020141  A     1/1995
    JP         H08160065  A     6/1996
    JP         2000162229 A     6/2000
    JP         2002286519 A    10/2002
    JP         2004061412 A     2/2004
    JP         2009105100 A     5/2009
    JP         2011187619 A     9/2011
    WO     WO-2013/137336 A1    9/2013

* cited by examiner

FIG.6
(a)
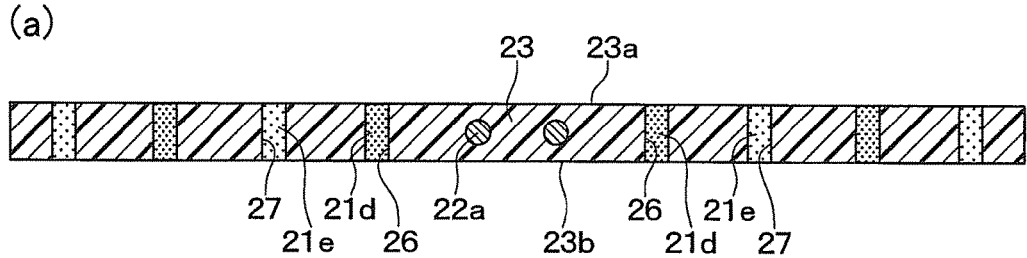
(b)
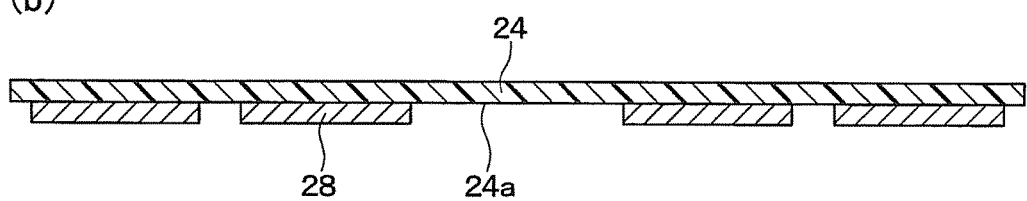
(c)
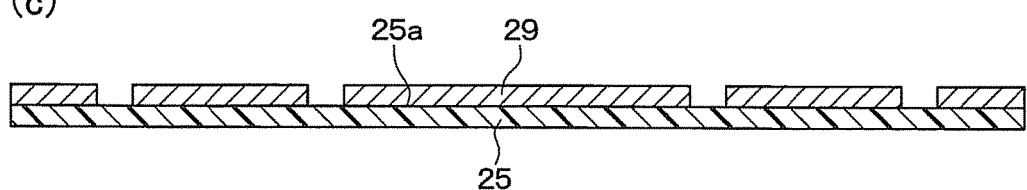
(d)
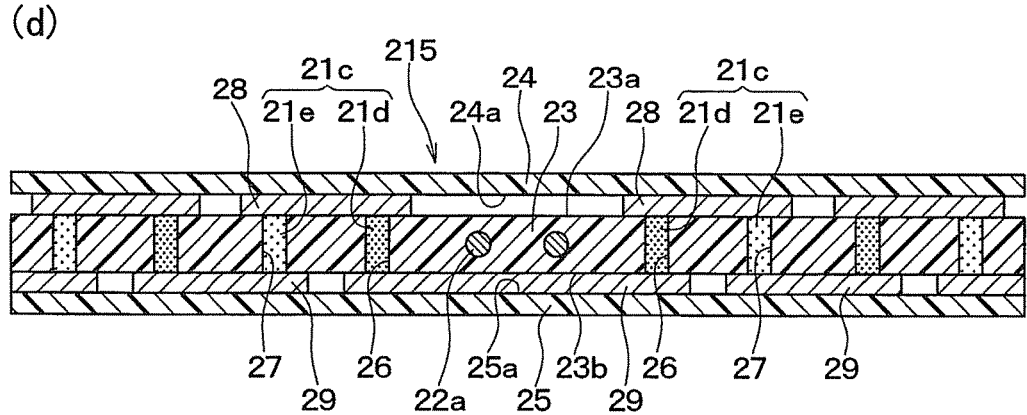

WHEN THERE IS NO WIND

WHEN WIND FLOWS

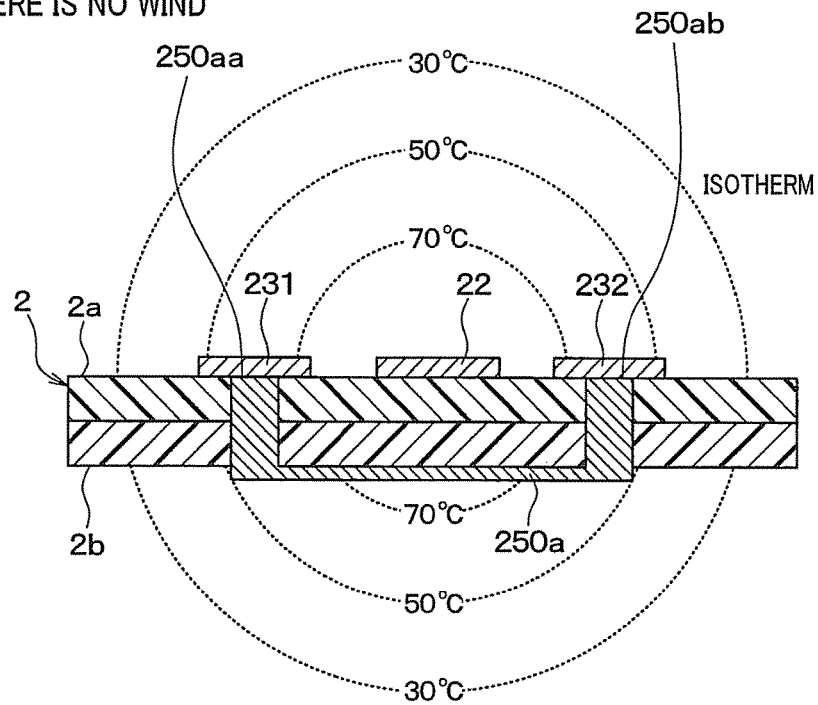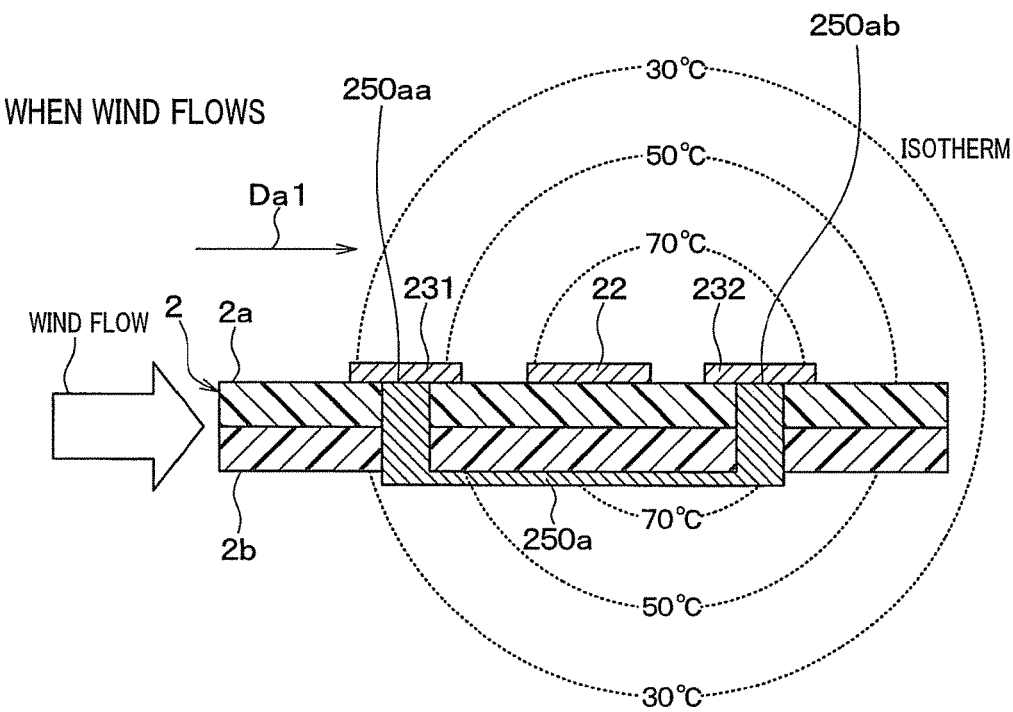

WIND DIRECTION METER, WIND DIRECTION/FLOW METER, AND MOVEMENT DIRECTION METER

CROSS REFERENCE TO RELATED APPLICATIONS

This application is a U.S. National Phase Application under 35 U.S.C. 371 of International Application No. PCT/JP2015/063498 filed on May 11, 2015 and published in Japanese as WO 2015/186476 A1 on Dec. 10, 2015. This application is based on and claims the benefit of priority from Japanese Patent Application No. 2014-114824 filed on Jun. 3, 2014 and Japanese Patent Application No. 2015-084450 filed on Apr. 16, 2015. The entire disclosures of all of the above applications are incorporated herein by reference.

TECHNICAL FIELD

The present invention relates to a wind direction meter, a wind direction/flow meter, and a movement direction meter.

BACKGROUND ART

As a conventional wind direction meter, there is a vane-type wind direction meter which uses the same principles as a weathervane (e.g., refer to PTL1). The wind direction meter is provided with a rotary shaft supported by a bearing, and a vane (arrow feather) which receives the wind and is rotatable around the rotary shaft, and indicates the wind direction by the direction in which the vane is oriented.

CITATION LIST

Patent Literature

PTL1: JP-A-H08-160065

SUMMARY OF THE INVENTION

Technical Problem

However, when measuring the wind direction, the aforementioned conventional wind direction meter generates friction in the mechanically movable parts constituted by the bearing and the rotary shaft. Thus, while the conventional wind direction meter can detect the wind direction of a comparatively high wind speed, there has been difficulty in detecting the wind direction of a weak wind such as an indoor airflow.

Therefore, wind direction meters and wind direction/flow meters are desired to have the ability of detecting the direction of a weak wind. Similarly, movement direction meters, which use a wind direction meter for measuring the movement direction of an object to be moved, are also desired to have the ability of detecting the direction of a weak wind.

In light of the circumstances set forth above, the present invention has an object to provide a wind direction meter, a wind direction/flow meter, and a movement direction meter, which are capable of detecting the direction of a weak wind.

Solution to Problem

To achieve the aforementioned purpose, the wind direction meter of the subject matter recited in claim 1 is a wind direction meter having a first surface (2a) and measuring a direction of a wind flowing above the first surface (2a), and has the following features. Specifically, the wind direction meter includes: a plurality of sensors (2) each formed with the first surface and provided with: a thermoelectric conversion element (21, 21A, 21B, 370) having a first conductor (21a, 250a) that has a first end (21aa, 250aa) and a second end (21ab, 250ab) opposite to the first end made of a metal or a semiconductor, and having a second conductor (21b, 250b) that has a first end (21ba, 250ba) and a second end (21bb, 250bb) opposite to the first end made of a metal or a semiconductor different from the first conductor, the first conductor and the second conductor being serially connected to each other, and the first ends (21aa, 21ba, 250aa, 250ba) being on a mutually connected side of the first conductor and the second conductor, and the second end (21ab, 250ab) of the first conductor, and the second end (21bb, 250bb) of the second conductor generating electrical outputs, when a temperature difference occurs; and a temperature changing unit (22, 320) for changing an ambient temperature by performing at least one of heat generation and heat absorption. In the wind direction meter, when the surrounding air, whose temperature has been changed by the temperature changing unit, is moved by the wind to cause a temperature difference between the first end and the second end of the respective first conductor and the second conductor, the outputs are ensured to be generated in conformity with the temperature difference, and the outputs, which are generated when the wind flows in a predetermined direction, have values different from each other; and a wind direction calculation unit (3) is provided for calculating a direction of the wind on the basis of a difference between the values of the outputs generated in each of the plurality of sensors.

With this configuration, since the wind direction is detected by using a thermoelectric conversion element which does not have mechanically movable parts, the wind direction of a weak wind can be detected.

Further, a wind direction/flow meter of the subject matter recited in claim 5 is a wind direction/flow meter which includes the wind direction meter according to claim 1. In the wind direction/flow meter, the wind direction calculation unit also configures a flow meter for calculating a wind volume on the basis of the values of the outputs. Since this configuration, includes the wind direction meter recited in claim 1, the wind direction of a weak wind can be detected.

Further, a movement direction meter of the subject matter recited in claim 6 has a first surface and arranged in a moving body (50) to measure a movement direction of the moving body by measuring a wind relatively generated to the moving body, the wind being generated above the first surface when the moving body moves, and has the following features. Specifically, the movement direction meter includes: a plurality of sensors (2) each formed with the first surface and provided with: a thermoelectric conversion element (21, 21A, 21B, 370) having a first conductor (21a, 250a) that has a first end (21aa, 250aa) and a second end (21ab, 250ab) opposite to the first end and is made of a metal or a semiconductor, and having a second conductor (21b, 250b) that has a first end (21ba, 250ba) and a second end (21bb, 250bb) opposite to the first end and is made of a metal or a semiconductor different from the first conductor, the first conductor and the second conductor being serially connected to each other, and the first ends (21aa, 21ba, 250aa, 250ba) on mutually connected side of the first conductor and the second conductor, and the second end (21ab, 250ab) of the first conductor, and the second end (21bb, 250bb) of the second conductor generating electrical outputs when a temperature difference occurs; and a temperature changing unit (22, 320) for changing an ambient temperature by performing at least one of heat generation and heat absorption. In the movement direction meter, when the surrounding air, whose temperature has been changed by the temperature changing unit, is moved by the wind to cause a temperature difference between the first end and the second end of the respective first conductor and the second conductor, the outputs are ensured to be generated in conformity with the temperature difference; and the outputs, which are generated when the wind flows in a predetermined direction, have values different from each other; and a movement direction calculation unit (3A) is provided for calculating a movement direction of the moving body on the basis of a difference between the values of the outputs generated in each of the plurality of sensors.

With this configuration, the wind direction is detected by using a thermoelectric conversion element which does not have mechanically movable parts. Thus, when a moving body is moved, by measuring the wind generated relative to the moving body, the wind direction of the wind can be detected even when the wind is weak.

BRIEF DESCRIPTION OF THE DRAWINGS

FIG. 6 is a set of cross-sectional views illustrating steps of producing the sensor 2, according to the first embodiment.

FIG. 21 is a diagram illustrating temperature distribution in the vicinity of the sensor 2 when there is no wind, according to the third embodiment.

FIG. 22 is a diagram illustrating temperature distribution in the vicinity of the sensor 2 when wind flows, according to the third embodiment.

TECHNICAL PROBLEM

Figure 1:
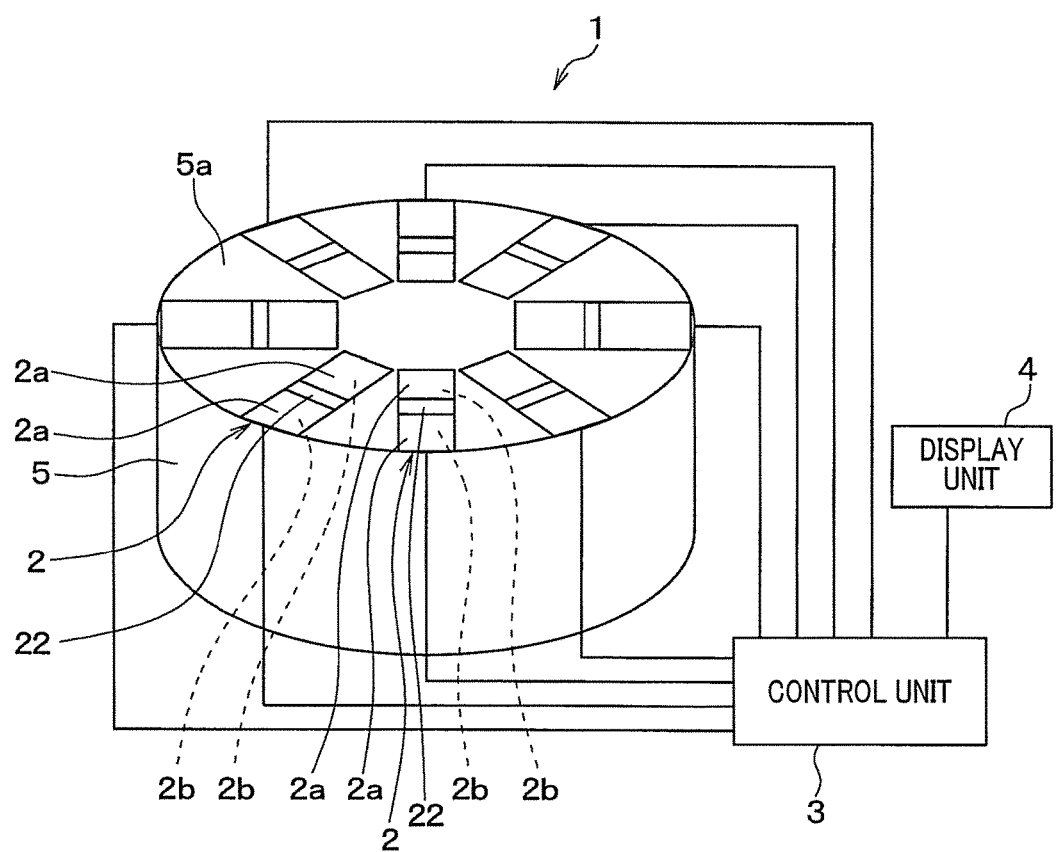
FIG. 1 is a perspective view illustrating a general configuration of a wind direction meter 1, according to a first embodiment.

With reference to the drawings, hereinafter will be described some embodiments of the present invention. It should be noted that, in each of the following embodiments, portions that are the same as or equivalent to each other are given the same reference signs in the drawings.

First Embodiment

With reference to FIGS. 1 to 8, a wind direction meter 1 according to a first embodiment of the present invention will be described. The wind direction meter 1 is a device which has a first surface 2a, measures the direction of the wind flowing above the first surface 2a, and, as shown in FIG. 1, has a plurality of sensors 2, a control unit 3, and a display unit 4. As an example, the wind direction meter 1 is configured to have eight sensors 2.

Figure 2:
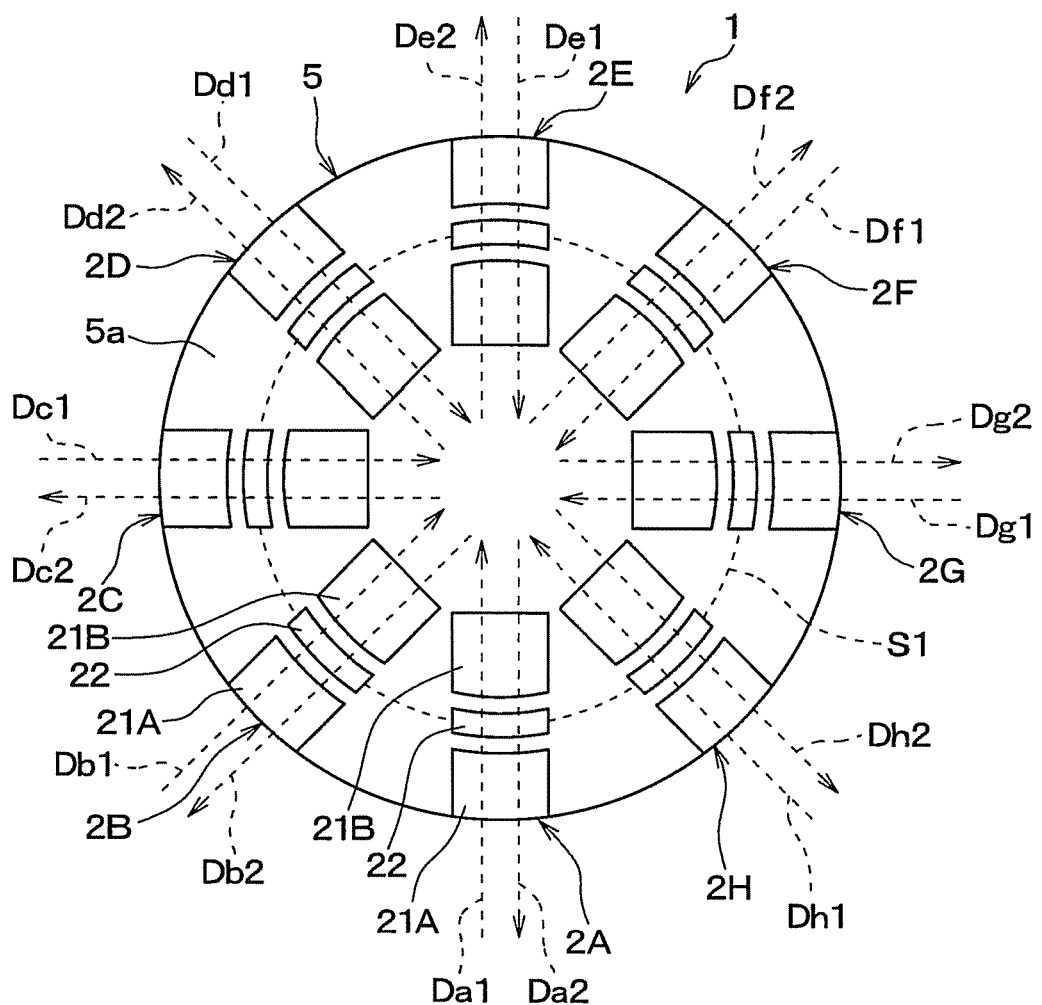
FIG. 2 is a diagram illustrating a planar configuration of the wind direction meter 1 shown in FIG. 1.

As shown in FIGS. 1 to 5, the plurality of sensors 2 are each configured by a sheet-like multilayer substrate having the first surface 2a and a second surface 2b opposite to the first surface 2a. As shown in FIGS. 1 and 2, the plurality of sensors 2 are each provided to a plane 5a of a fixing member 5, with the second surface 2b being adhered to the plane 5a of the fixing member 5. Specifically, in the present embodiment, the entirety of each second surface 2b of the sensor 2 is covered with the fixing member 5. Further, the plurality of sensors 2 are disposed in a manner of being offset from each other in the rotation direction centered on an axis perpendicular to the plane 5a. The plurality of sensors 2 are disposed at different positions on the circumference (refer to the dashed line S1 in FIG. 2) centered on the axis perpendicular to the plane 5a. Specifically, eight sensors 2 are disposed at even intervals on a circumference S1. Although this will be described in detail below, as shown in FIG. 2, the wind direction meter 1 according to the present embodiment can calculate the direction of the wind in 16 directions (refer to the arrows Da1, Da2, Db1, . . . , Dh2 of FIG. 2) in the radial direction of the circle having the circumference S1. The 16 directions include directions substantially coinciding with each other (e.g., the arrows Da1 and De2 of FIG. 2 coincide with each other). Thus, the directions of the wind which can be measured in the wind direction meter 1 of the present embodiment are substantively eight directions.

Figure 4:
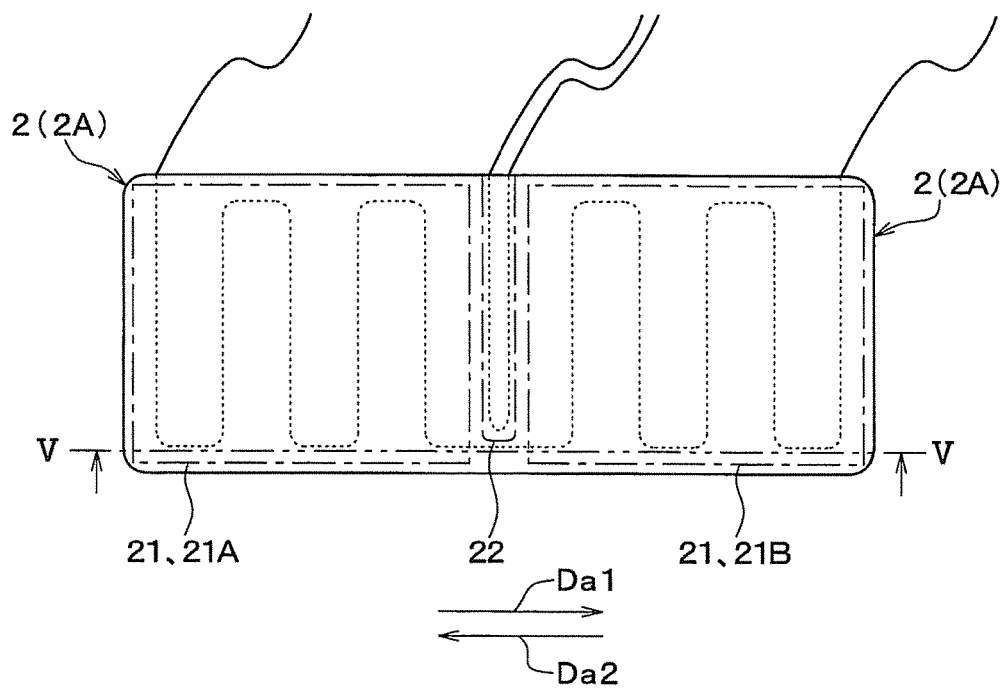
FIG. 4 is a plan view of a sensor 2 shown in FIG. 1.
Figure 5:
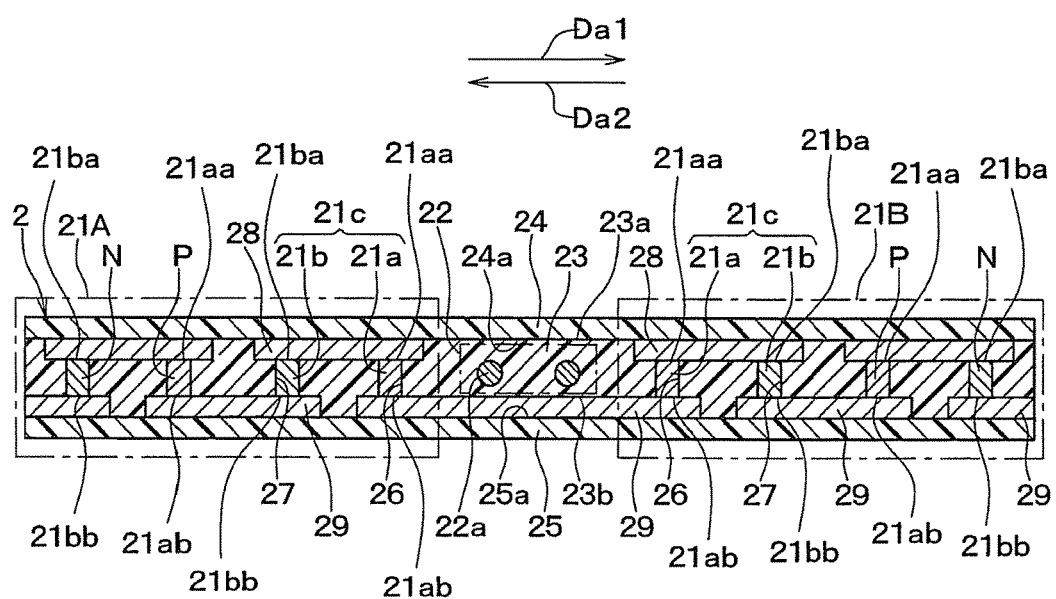
FIG. 5 is a cross-sectional view taken along the line V-V of FIG. 4.

As shown in FIGS. 4 and 5, the plurality of sensors 2 are each configured by two thermoelectric conversion elements 21 (a first thermoelectric conversion element 21A and a second thermoelectric conversion element 21B) and a heater 22. The two thermoelectric conversion elements 21 are disposed being interposed by the heater 22 therebetween, and are serially connected via wiring (back surface patterns 29 described later). As an example herein, as shown in FIG. 5, the two thermoelectric conversion elements 21 and the heater 22 are disposed in the order of the first thermoelectric conversion element 21A, the heater 22, and the second thermoelectric conversion element 21B in a direction parallel to the first surface 2a and the second surface 2b of the sensor 2. The sensor 2 is arranged in the plane 5a of the fixing member 5 so that the first and second thermoelectric conversion elements 21A and 21B are located on both sides of the heater 22 in a direction parallel to the flow direction (refer to the arrows Da1, Da2 of FIG. 5) of the wind as an object to be detected.

Specifically, as shown in FIG. 5, the sensor 2 is configured by a multilayer substrate which is an integration of an insulating base material 23, a front surface protective member 24 having the first surface 2a, and a back surface protective member 25. The thermoelectric conversion elements 21 and the heater 22 are arranged inside the multilayer substrate.

As shown in FIG. 5, each thermoelectric conversion element 21 has a first interlayer connection member 21a and a second interlayer connection member 21b, and generates an electromotive force, i.e., a voltage, according to the temperature difference between both ends 21aa, 21ba, 21ab, 21bb of the respective first and second interlayer connection members 21a and 21b. The first and second interlayer connection members 21a and 21b are serially connected via wiring (front surface patterns 28 described later), and are electrically connected to the control unit 3. The first interlayer connection member 21a is made of a metal or semiconductor, and the second interlayer connection member 21b is made of a different metal or semiconductor than the first interlayer connection member 21a. The first interlayer connection member 21a corresponds to the first conductor in the claims, and the second interlayer connection member 21b corresponds to the second conductor in the claims.

As shown in FIG. 5, in the sensor 2 of the present embodiment, first ends 21aa, 21ba connected to each other on one side of the first and second interlayer connection members 21a, 21b are respectively opposed to a second end 21ab opposite to the first end 21aa of the first interlayer connection member 21a and a second end 21bb opposite to the first end 21ba of the second interlayer connection member 21b. More specifically, the first ends 21aa, 21ba are disposed so as to be respectively opposed to and in alignment with the second ends 21ab, 21bb in a direction perpendicular to the directions Da1, Da2 in which the wind flows. Further, in the present embodiment, the first ends 21aa, 21ba are disposed on the first surface 2a side of the sensor 2, and the second ends 21ab, 21bb are disposed on the second surface 2b side of the sensor 2.

Further, as shown in FIG. 5, in the present embodiment, a plurality (two) of the thermoelectric conversion elements 21 are connected in series via wiring (back surface pattern 29 described later) in each of the plurality of sensors 2. Thus, in the present embodiment, the electromotive force of the sensor 2 can be intensified, and thus high sensitivity can be imparted to the sensor 2.

The heater 22 is a heat source for generating heat, and is configured by a heating wire, such as a nichrome wire, which generates heat when current is applied. The heater 22 is provided as a temperature changing unit for changing ambient temperature by generating heat. The heater 22 is electrically connected to the control unit 3. In place of the heater 22, a cooler which changes the ambient temperature by absorbing heat may be used as the temperature changing unit for changing ambient temperature.

In the present embodiment, the insulating base material 23 is made of a thermoplastic resin film, which is rectangular in plan view, typified such as by a polyether ether ketone (PEEK), polyetherimide (PEI), or liquid crystal polymer (LCP).

First and second via holes 26, 27 of the present embodiment each have a cylindrical shape with a fixed diameter and extend from the first surface 2a to the second surface 2b, but may have a tapered shape with the diameter becoming smaller from the first surface 2a towards the second surface 2b. Further, the first and second via holes 26, 27 may each have a tapered shape with the diameter becoming smaller from the second surface 2b towards the first surface 2a, or may be formed in a rectangular tube.

The first interlayer connection member 21a is disposed in the first via hole 26, and the second interlayer connection member 21b is disposed in the second via hole 27. That is, the first and second interlayer connection members 21a, 21b are alternately disposed in the insulating base material 23.

Since the first and second interlayer connection members 21a, 21b are disposed in the first and second via holes 26, 27, high sensitivity of the first and second interlayer connection members 21a, 21b is ensured by appropriately changing the number, diameter, interval, and the like of the first and second via holes 26, 27. In the present embodiment, the electromotive force of the sensor 2 can be increased in this way, and a high sensitivity is imparted to the sensor 2.

The first and second interlayer connection members 21a, 21b are made of different metals or semiconductors in order to bring about the Seebeck effect. For example, the first interlayer connection member 21a is made of a solid phase sintered metal compound in order to maintain a crystal structure of a plurality of metal atoms forming P-type Bi—Sb—Te alloy powder prior to sintering. Further, the second layer connection member 21b is made of a solid phase sintered metal compound in order to maintain a crystal structure of a plurality of metal atoms forming N-type Bi—Te alloy powder prior to sintering. Thus, the metal for forming each of the first and second interlayer connection members 21a, 21b is a sintered alloy that is sintered in a state where the plurality of metal atoms maintain the crystal structure of the metal atoms. This enables increase in the electromotive force generated by the first and second interlayer connection members 21a, 21b which are alternately connected in series, and thus a high sensitivity is imparted to the sensor 2.

As described above, the wind direction meter 1 according to the present embodiment uses the highly sensitive sensor 2. Accordingly, use of the sensor 2 enables detection of the direction of a weak wind flowing above the first surface 2a.

As shown in FIG. 5, the front surface 23a of the insulating base materials 23 is arranged with the front surface protective member 24 formed of a thermoplastic resin film, which is rectangular in plan view, typified such as by a polyether ether ketone (PEEK), polyetherimide (PEI), and liquid crystal polymer (LCP). The front surface protective member 24 is ensured to have the same shape in plan view as that of the insulating base material 23. The front surface protective member 24 has a surface 24a opposing the insulating base material 23 and formed with a plurality of front surface patterns 28 obtained by patterning a copper foil, etc. so as to be spaced apart from each other. The front surface patterns 28 are appropriately electrically connected to the respective first and second interlayer connection members 21a, 21b.

Specifically, as shown in FIG. 5, when a pair 21c is formed by a first interlayer connection member 21a and a second interlayer connection member 21b that are adjacent to each other, the first and second interlayer connection members 21a, 21b of each pair 21c are connected to the same single front surface pattern 28. In short, the first and second interlayer connection members 21a, 21b of each pair 21c are electrically connected to each other via the front surface pattern 28. In the present embodiment, the pair 21c is formed by a first interlayer connection member 21a and a second interlayer connection member 21b that are adjacent to each other along the longitudinal direction (the left-right direction in FIG. 4) of the insulating base material 23.

The insulating base material 23 has a back surface 23b which is opposite to the front surface 23a. The back surface 23b is arranged with the back surface protective member 25 which is rectangular in plan view and formed of a thermoplastic resin film such as of polyether ether ketone (PEEK), polyetherimide (PEI), and liquid crystal polymer (LCP). The back surface protective member 25 has a length in the longitudinal direction of the insulating base material 23 longer than the insulating base material 23, and is disposed on the back surface 23b of the insulating base material 23 so that both end parts in the longitudinal direction project from the insulating base material 23.

The back surface protective member 25 has a first surface 25a opposing the insulating base material 23 and formed with a plurality of back surface patterns 29 obtained by patterning a copper foil, etc. so as to be spaced apart from each other. Each of the back surface patterns 29 is appropriately electrically connected to the corresponding first and second interlayer connection members 21a, 21b.

Specifically, as shown in FIG. 5, in the two pairs 21c that are adjacent to each other, the first interlayer connection member 21a of one of the pairs 21c and the second interlayer connection member 21b of the other pair 21c are connected to the same single back surface pattern 29. In short, bridging the pairs 21c, the first and second interlayer connection members 21a, 21b are electrically connected to each other via the same single back surface pattern 29.

In this way, the pairs 21c are serially connected as shown by the dashed line in FIG. 4. The dashed line in FIG. 4 shows a plurality of serially connected pairs 21c and the wiring.

In the heater 22 of each sensor 2, a heating wire 22a is buried inside the insulating base material 23. The back surface pattern 29 is formed under the heater 22 of the sensor 2 so as to straddle the heater 22. The first and second interlayer connection members 21a, 21b of the first thermoelectric conversion element 21A are serially connected to the first and second interlayer connection members 21a, 21b of the second thermoelectric conversion element 21B via the back surface patterns 29.

As shown in FIG. 5, of the back surface patterns 29 in each sensor 2 of the present embodiment, those which correspond to the end portions of the serial connection described above are formed being exposed from the insulating base material 23. An end portion exposed from the insulating base material 23 among the back surface patterns 29 serves as a terminal connected to the control unit 3.

As shown in FIG. 5, in each sensor 2 of the present embodiment, the structures of the two thermoelectric conversion elements 21 (the first and second interlayer connection members 21a, 21b, the front surface patterns 28, and the back surface patterns 29) are linearly symmetric with respect to the heater 22 provided as an axis between the two thermoelectric conversion elements 21. Namely, the first and second thermoelectric conversion elements 21A and 21B have the same basic structure, such as of having the same shape and magnitude, and also have the same distance from the heater 22. Further, between the first and second thermoelectric conversion elements 21A and 21B, the connection sequence of the first and second interlayer connection members 21a and 21b is reversed. Therefore, between the first and second thermoelectric conversion elements 21A and 21B of the present embodiment, a reverse relationship is established in terms of the level of temperature and the polarity of electromotive force in the respective first ends 21aa, 21ba and second ends 21ab, 21bb of the first and second interlayer connection members 21a, 21b. For example, if the first ends 21aa, 21ba of the first and second interlayer connection members 21a, 21b have a higher temperature than the second ends 21ab, 21bb in both of the two thermoelectric conversion elements 21, the two thermoelectric conversion elements 21 generate electromotive forces having different polarities (e.g., one is positive and the other is negative). Further, if the first ends 21*aa*, 21*ba* of the first and second interlayer connection members 21*a*, 21*b* have a lower temperature than the second ends 21*ab*, 21*bb* in both of the two thermoelectric conversion elements 21 as well, the two thermoelectric conversion elements 21 generate electromotive forces having different polarities. Further, if the first ends 21*aa*, 21*ba* have a higher temperature than the second ends 21*ab*, 21*bb* in the first thermoelectric conversion element 21A, and the first ends 21*aa*, 21*ba* have a lower temperature than the second ends 21*ab*, 21*bb* in the second thermoelectric conversion element 21B, the two thermoelectric conversion elements 21 generate electromotive forces having the same polarity. Thus, in the sensor 2, electromotive forces of the same polarity are generated when a reverse relationship is established between the first and second thermoelectric conversion elements 21A and 21B, in terms of the level of temperature at the first ends 21*aa*, 21*ba* and the second ends 21*ab*, 21*bb*.

The configuration of the sensor 2 of the present embodiment is as described above. In each of the regions of the first and second thermoelectric conversion elements 21A and 21B of the sensor 2, the first ends 21*aa*, 21*ba* of the first and second interlayer connection members 21*a*, 21*b* connected to each other are arranged on the first surface 2*a* side, and the second ends 21*ab*, 21*bb* thereof are arranged on the second surface 2*b* side. Therefore, if the temperature on the first surface 2*a* side is different from the temperature on the second surface 2*b* side in the sensors 2, the temperature at the first ends 21*aa*, 21*ba* of the first and second interlayer connection members 21*a*, 21*b* will be different from the temperature at the second ends 21*ab*, 21*bb* thereof. In the sensor 2, the temperature difference leads to generation of an electromotive force, the degree of which depends on the degree of difference in the temperature. The wind direction meter 1 of the present embodiment outputs the electromotive force as a sensor signal to the control unit 3. The electromotive force is changed when the aforementioned temperature difference is changed.

With reference to FIG. 6, a method of manufacturing the sensor 2 of the present embodiment will be described.

The method uses the insulating base material 23 as shown in FIG. 6(*a*). The insulating base material 23 is formed as follows. The insulating base material 23 to be used herein is embedded with a heater 22. A plurality of the first via holes 26 are formed in the insulating base material 23 by means of a drill, a laser, or the like. Next, the first via holes 26 are filled with a first conductive paste 21*d*. The method (device) of filling the first via holes 26 with the first conductive paste 21*d* may be the method (device) described in Japanese Patent Application No. 2010-50356 filed by the present applicants.

When the method is briefly described, although not shown, the insulating base material 23 is arranged on a holding table, via absorption paper, so that the back surface 23*b* is opposed to the absorption paper. Then, the first conductive paste 21*d*, while being melted, is filled in the first via holes 26. Thus, most of the organic solvent in the first conductive paste 21*d* is adsorbed by the absorption paper, and the alloy powder is arranged being in intimate contact with the first via hole 26.

The absorption paper only has to be a material capable of adsorbing the organic solvent in the first conductive paste 21*d*, and may be generally used high quality paper. The first conductive paste 21*d* is a paste material obtained by adding an organic solvent, such as paraffin, having a melting point of 43° C., to a Bi—Sb—Te alloy powder in which the metal atoms maintain a predetermined crystal structure. Therefore, the first conductive paste 21*d* is filled in a state where the front surface 23*a* of the insulating base material 23 is heated to approximately 43° C.

Subsequently, a plurality of the second via holes 27 are formed in the insulating base material 23 by means of a drill, laser, and the like.

Next, a second conductive paste 21*e* is filled in the second via holes 27. This process can be performed similarly to the process of filling the first conductive paste 21*d*. Namely, although not shown, after arranging the insulating base material 23 on the holding table, via the absorption paper, so that the back surface 23*b* is opposed to the absorption paper, the second conductive paste 21*e* is filled in the second via holes 27. Thus, most of the organic solvent in the second conductive paste 21*e* is adsorbed by the absorption paper, and the alloy powder is arranged being in intimate contact with the second via holes 27.

The second conductive paste 21*e* is a pasted material obtained by adding an organic solvent, such as terpineol, having a melting point of room temperature, to a Bi—Te alloy powder in which the metal atoms different from those constituting the first conductive paste 21*d* maintain a predetermined crystal structure. In other words, the organic solvent constituting the second conductive paste 21*e* is one having a melting point lower than that of the organic solvent constituting the first conductive paste 21*d*. The second conductive paste 21*e* is filled in a state where the front surface 23*a* of the insulating base material 23 is maintained at room temperature. In other words, the filling of the second conductive paste 21*e* is performed in a state where the organic solvent contained in the first conductive paste 21*d* is solidified. Thus, the second conductive paste 21*e* is prevented from mixing into the first via holes 26.

The state where the organic solvent contained in the first conductive paste 21*d* is solidified refers to the state where the organic solvent remains in the first via hole 26 without being adsorbed by the absorption paper in the process of filling the first conductive paste 21*d*.

The method also uses the front surface protective member 24 and the back surface protective member 25 shown in (b) and (c) of FIG. 6. These members are formed as follows. First, a copper foil, etc., is formed on each of the first surfaces 24*a*, 25*a* of the front surface protective member 24 and the back surface protective member 25, respectively, facing the insulating base material 23. Then, by appropriately patterning the copper foils, a plurality of front surface patterns 28 spaced apart from each other and a plurality of back surface patterns 29 spaced apart from each other are formed on the front surface protective member 24 and the back surface protective member 25, respectively.

Then, as shown in FIG. 6(*d*), the back surface protective member 25, the insulating base material 23, and the front surface protective member 24 are laminated in this order to form a laminate 215. The laminate 215 is placed between a pair of press plates, not shown, followed by heating and pressing the laminate in a vacuum state from above and below in the lamination direction, thereby integrating the laminate. Specifically, the first and the second conductive pastes 21*d*, 21*e* are solid-phase sintered to form the first and second interlayer connection members 21*a*, 21*b*, while performing heating and pressing so that the first and second interlayer connection members 21*a*, 21*b* are connected to the front surface patterns 28 and the back surface patterns 29, respectively, to thereby integrate the laminate 215.

Although not specifically limited, when integrating the laminate 215, a cushioning material such as rock wool paper may be arranged between the laminate 215 and each of the press plates. The sensor 2 is produced as described above.

Further, as shown in FIG. 1, the control unit 3 is the wind direction calculation unit for calculating the direction of the wind which is an object to be measured on the basis of a detection result of the sensors 2. The control unit 3 is an electronic control unit configured by a microcomputer, a memory as a storage section, and a peripheral circuit thereof, and performs a predetermined arithmetic processing according to a given program to control the operation of the display unit 4. Further, the control unit 3 functions as a unit for controlling the activation and deactivation of the heaters 22.

The display unit 4, such a monitor, displays the wind direction calculated by the control unit 3.

The fixing member 5 having a plane 5a serves as a member for fixing the plurality of sensors 2 in the plane 5a. The fixing member 5 of the present embodiment is formed of a material which transfers less heat than the air above the first surface 2a (or, the wind flowing above the first surface 2a) or the material for forming the sensor 2, and thus is formed of resin, for example.

Figure 7:
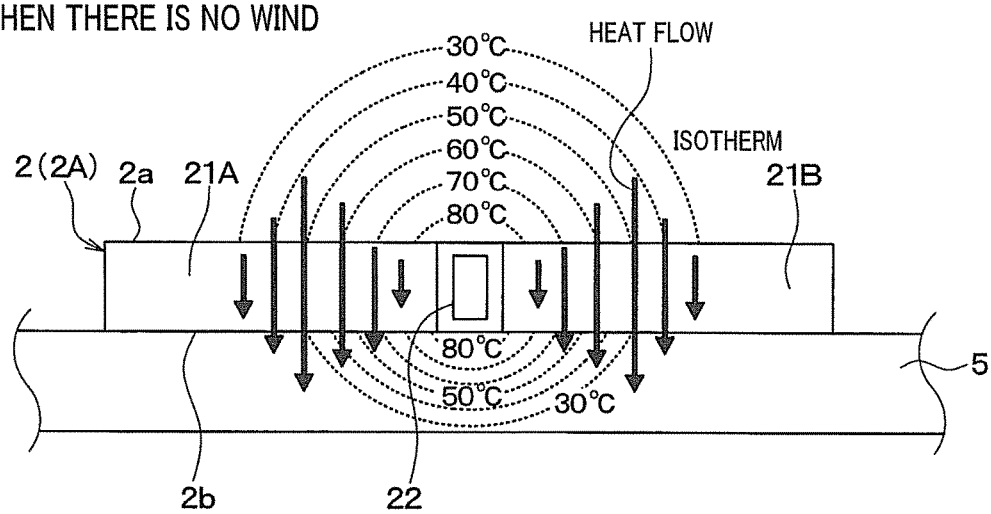
FIG. 7 is a diagram illustrating temperature distribution in the vicinity of the sensor 2 when there is no wind, according to the first embodiment.
Figure 8:
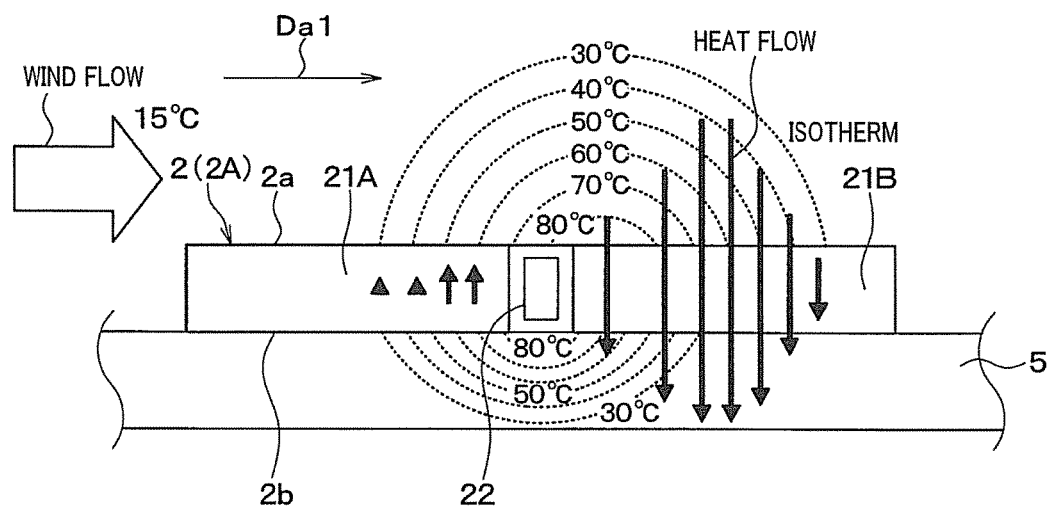
FIG. 8 is a diagram illustrating temperature distribution in the vicinity of the sensor 2 when wind flows, according to the first embodiment.

Referring now to FIGS. 7 and 8, the method of measuring the wind direction using the wind direction meter 1 of the present embodiment will be described.

When measuring the wind direction with the wind direction meter 1 of the present embodiment, the heaters 22 in the plurality of (eight) sensors 2 are activated to generate heat.

Initially, operation in a sensor 2 will be described.

First, the case when the wind, as an object to be measured, in the sensor 2 (the wind flowing above the first surface 2a) does not flow (hereinafter, referred to as when there is no wind) will be described. As shown in FIG. 7, when there is no wind, the heat of the heater 22 is transmitted to form the temperature distribution shown by the isotherm of FIG. 7 in the air (or the wind) on the first surface 2a side of the sensor 2, while forming a temperature distribution shown by the isotherm of FIG. 7 in the fixing member 5 on the second surface 2b side of the sensor 2. The first surface 2a side of the sensor 2 reaches a temperature in conformity with the temperature distribution of the air (wind) above the first surface 2a, and the second surface 2b side of the sensor 2 reaches a temperature in conformity with the temperature distribution of the fixing member 5. Specifically, a temperature distribution is formed on the first surface 2a side and the second surface 2b of the sensor 2 side, in which an area closer to the heater 22 has a higher temperature. In the sensor 2 of the present embodiment, as stated above, the structures of the two thermoelectric conversion elements 21 are linearly symmetric with respect to the heater 22 as an axis. Therefore, as shown in the isotherm of FIG. 7, the sensor 2 of the present embodiment transmits the heat generated from the heater 22, when there is no wind, equally to both sides (two thermoelectric conversion elements 21) sandwiching the heater 22. Specifically, compared to the temperature generated when the distances from the heater 22 on the first and second surfaces 2a and 2b of the sensor 2 are the same, the temperature on the first surface 2a side where the wind passes becomes higher than the temperature on the second surface 2b side provided with the fixing member 5. As a result, the two corresponding first interlayer connection members 21a sandwiching the heater 22 and disposed in symmetric positions have equivalent temperature differences between both ends (the first end 21aa and the second end 21ab of FIG. 5). Similarly, the two corresponding second interlayer connection members 21b sandwiching the heater 22 and disposed in symmetric positions have equivalent temperature differences between both ends (the first end 21aa and the second end 21ab of FIG. 5). Furthermore, the sensor 2 of the present embodiment is configured, as stated above, such that a reverse relationship is established in respect of the level of temperature and the polarity of electromotive force. Therefore, in the sensor 2 of the present embodiment, when there is no wind, the respective electromotive forces generated by the two thermoelectric conversion elements 21 are of equivalent magnitude and the polarities thereof are the reverse of each other. Thus, the entire electromotive force of the respective plurality of sensors 2 becomes zero. Similarly, the electromotive force of the plurality of sensors 2 becomes zero when there is no wind. Since the present embodiment is provided with the fixing member 5 configured by a material which hardly transfers heat, the interval of each isotherm is smaller, as shown in FIG. 7, in the temperature distribution on the second surface 2b side of the sensor 2 than the temperature distribution on the first surface 2a side.

The case when the wind (the wind flowing above the first surface 2a), as an object to be measured, flows to the sensor 2 will be described by way of an example in which the wind flows in the direction of the arrow Da1 to a sensor 2A shown in FIG. 2. As shown in FIG. 8, when the wind as an object to be measured flows, the temperature distribution shown by the isotherm of FIG. 8 is formed in the air (or the wind) on the first surface 2a side of the sensor 2, and the temperature distribution shown by the isotherm of FIG. 8 is formed in the fixing member 5 on the second surface 2b side of the sensor 2. In the present embodiment, when the wind flows above the first surface 2a, the air (hereinafter, referred to as hot air) on the first surface 2a side in the surrounding air whose temperature has been changed by the heater 22 is moved in the direction (right direction of FIG. 8) parallel to the first surface 2a by the wind. In this case, in the present embodiment, the entirety of the second surface 2b of the sensor 2 is covered with the fixing member 5 as mentioned above, and thus the wind does not flow to the second surface 2b side of the sensor 2. Therefore, the second surface 2b side air of the hot air is not moved by the wind (or, is moved slowly compared to the air on the first surface 2a side). Therefore, as shown in FIG. 8, when the wind flows over the wind direction meter 1 of the present embodiment, the temperature distribution is changed in the air (or the wind) on the first surface 2a side of the sensor 2.

As a result, immediately after flow of the wind over the sensor 2, the first surface 2a side in the thermoelectric conversion element 21 on the right side of FIG. 8 will have a high temperature as shown in FIG. 8, and further, the respective first ends 21aa, 21ba of the first and second interlayer connection members 21a, 21b will have a high temperature. Further, the first surface 2a side in the thermoelectric conversion element 21 on the left side of FIG. 8 will have a low temperature, and further, the respective first ends 21aa, 21ba of the first and second interlayer connection members 21a, 21b will have a low temperature. In this case, as stated above, the air of the second surface 2b side is not moved by the wind. Thus, the temperature will not change in the respective second ends 21ab, 21bb of the first and second interlayer connection members 21a, 21b of the two thermoelectric conversion elements 21 of FIG. 8. Therefore, in the two thermoelectric conversion elements 21, temperature difference is caused between both ends 21aa, 21ba and 21ab, 21bb of the first and second interlayer connection members 21a, 21b. Moreover, the temperature level is reversed between the first and second thermoelectric conversion elements 21A and 21B. Thus, in the present embodiment, immediately after flow of the wind over each of the two thermoelectric conversion elements 21, temperature difference is caused between the first ends 21aa, 21ba of the first and second interlayer connection members 21a, 21b, and the second end 21ab of the first interlayer connection member 21a and the second end 21bb of the second interlayer connection member 21b. Thus, the sensor 2 generates a positive electromotive force in conformity with the temperature difference between both ends 21aa, 21ba and 21ab, 21bb. In addition, since the two serially connected thermoelectric conversion elements 21 produce electromotive forces having the same polarity (positive), compared to the case when there is one thermoelectric conversion element 21, the electromotive force of the sensor 2 is intensified, and a high sensitivity can be imparted to the sensor 2. When the wind flows in the direction (arrow Da2 of FIG. 2) opposite to Da1, the sensor 2 generates a negative electromotive force having an absolute value equivalent to that of the electromotive force generated when the wind flows in the direction of Da1.

In the present embodiment, each sensor 2 operates as described above. Next, a method of measuring the wind direction using the plurality of (eight) sensors 2 operating in this way will be described.

Figure 3:
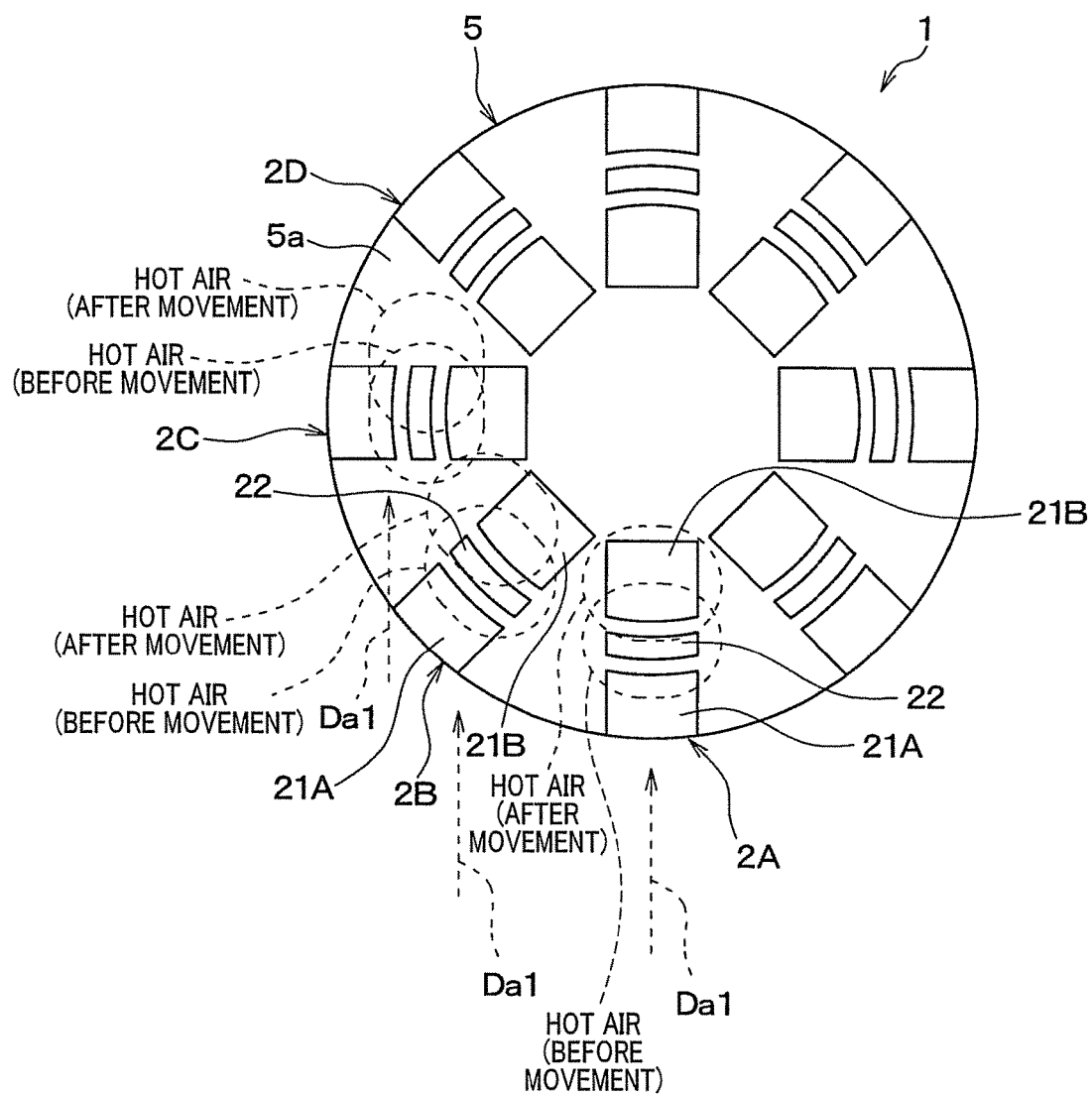
FIG. 3 is a diagram illustrating the movement of hot air generated by a heater 22 and corresponding to FIG. 2.

As stated above, the plurality of sensors 2 are disposed being offset from each other in the rotation direction centered on a line perpendicular to the plane 5a. Therefore, in the present embodiment, the plurality of sensors 2 generate electromotive forces of different values when the wind flows in a predetermined direction. Specifically, among the plurality of sensors 2, the sensor 2 above which the hot air has been moved by the wind over a wide range of the first surface 2a (the first ends 21aa, 21ba of the first and second interlayer connection members 21a, 21b) generates the electromotive force with a large absolute value. For example, as shown in FIG. 3, in the case when the direction of the wind is the direction of the arrow Da1 of FIG. 2, the hot air is transmitted over a wide range of the first surface 2a of the sensor 2A, and thus the absolute value of the electromotive force to be generated increases. Further, in this case, the hot air is transmitted over a narrower range in the sensor 2B compared to the sensor 2A, and thus the electromotive force to be generated decreases. Further, the hot air is transmitted over a further narrower range in the sensor 2C, and thus the electromotive force to be generated further decreases. Furthermore, the range over which the hot air that has been moved by the wind is transmitted to the first surface 2a depends upon to what extent the direction of the wind agrees with the direction of the row of the first thermoelectric conversion element 21A, the heater 22, the second and thermoelectric conversion element 21B for the respective sensors. Considering what has been described above, for example, by specifying the sensor 2 among the plurality of sensors 2, which has generated an electromotive force with positive polarity and with a maximum absolute value, the direction of the wind (the direction of Da1 when the electromotive force of the sensor 2A is positive and the maximum) can be measured.

When the wind flows in the opposite direction (in the direction of Da2 opposite of Da1 herein), the electromotive force of the sensor 2 becomes negative. This design may be used to ensure one sensor 2 can measure the two directions (Da1 and Da2) opposite to each other. In this case, for example, in the wind direction meter 1 of the present embodiment, the sensors 2E, 2F, 2G, 2H may be omitted and may include only the sensors 2A, 2B, 2C, 2D. With this configuration as well, all the directions (Da1 to Dh2) which can be measured when provided with eight sensors 2 (2A to 2H) can be measured.

In this way, the wind direction meter 1 of the present embodiment measures the direction of the wind, as an object to be measured, on the basis of the difference in the electromotive force generated in each of the plurality of sensors 2.

As described above, the wind direction meter 1 of the present embodiment detects the wind direction using the sensor 2 having no mechanically movable parts, enabling detection of a weak wind. Coupled with this configuration, use of the sensor 2 having a high sensitivity in the wind direction meter 1 of the present embodiment specifically enables detection of the direction of a weak wind.

Since the conventional wind direction meters as mentioned above have mechanically movable parts, the vane unavoidably rotates due to inertia when the wind direction changes. Therefore, there has been a problem that the wind direction has to be calculated waiting until cease of the rotation of the vane due to inertia, or taking account of the rotation due to the inertia. In this regard, such a problem is not raised with the wind direction meter 1 of the present embodiment using the sensor 2 having no mechanically movable parts.

An error with regards to the temperature difference between the first and second surfaces 2a and 2b may occur, for example, due to a change of the ambient environmental temperature. However, the sensor 2 of the present embodiment is configured, as stated above, such that a reverse relationship is established in respect of the level of temperature and the polarity of electromotive force between the first ends 21aa, 21ba and the second ends 21ab, 21bb of the respective first and second interlayer connection members 21a, 21b. Therefore, if the aforementioned error occurs, the electromotive forces generated by the two thermoelectric conversion elements 21 are of equivalent magnitude and the polarities thereof are reverse to each other. As a result, the entire electromotive force of the respective plurality of sensors 2 becomes zero. Therefore, the sensor 2 of the present embodiment does not have an adverse effect (has only a small effect) on the value of the electromotive force generated by the sensor 2 if the aforementioned error occurs due to a change of the ambient environmental temperature, for example.

As described above, the wind direction meter 1 of the present embodiment has the first surface 2a and measures the direction of the wind flowing above the first surface 2a, and is characterized by the employment of the following plurality of sensors 2 and the control unit 3. Namely, the sensor 2 is formed with the first surface 2a, and includes the first interlayer connection member 21a made of a metal or semiconductor, and a second interlayer connection member 21b made of a different metal or semiconductor than the first interlayer connection member 21a. Further, the sensor 2 is provided with a thermoelectric conversion element 21 for generating an electromotive force when a temperature difference occurs between the first ends 21aa, 21ba and the second ends 21ab, 21bb of the respective first and second interlayer connection members 21a, 21b. Moreover, the sensor 2 generates an electromotive force, when the surrounding air whose temperature has been changed by the heater 22 is moved by the wind to cause a temperature difference between the first ends 21aa, 21ba and the second ends 21ab, 21bb of the first and second interlayer connection members 21a, 21b. The control unit 3 calculates the direction of the wind, as an object to be measured, on the basis of the difference in electromotive force generated in each of the plurality of sensors 2.

In this way, since the wind direction meter 1 of the present embodiment uses the thermoelectric conversion element 21 having no mechanically movable parts to detect the wind direction, the direction of a weak wind can be detected. Coupled with this configuration, use of the sensor 2 having a high sensitivity in the wind direction meter 1 of the present embodiment specifically enables detection of the direction of a weak wind.

In the wind direction meter 1 of the present embodiment, the sensor 2 is configured such that the two thermoelectric conversion elements 21 are disposed sandwiching the heater 22, while being serially connected to each other via wiring (back surface pattern 29). Furthermore, the sensor 2 is configured such that a reverse relationship is established in respect of the level of temperature and the polarity of electromotive force between the first ends 21aa, 21ba and the second ends 21ab, 21bb of the respective first and second interlayer connection members 21a, 21b.

Therefore, the wind direction meter 1 of the present embodiment can increase the electromotive force generated by the sensor 2 and impart a high sensitivity to the sensor 2, compared to the case where the thermoelectric conversion element 21 is disposed on only one side of the heater 22.

(Modification 1)

In the aforementioned wind direction meter 1 of the present embodiment, the sensor 2 is provided with the two thermoelectric conversion elements 21 (the first and second thermoelectric conversion elements 21A and 21B) and the heater 22. However, in the wind direction meter 1 of the present embodiment, the sensor 2 may be provided with only one of the two thermoelectric conversion elements 21. With this configuration as well, when the wind as an object to be measured flows, the air on the first surface 2a side in the hot air is moved by the wind in a direction parallel to the first surface 2a, but the air on the first surface 2b side in the hot air is not moved by the wind. Therefore, an electromotive force is generated in conformity with the temperature difference which is due to the temperature difference between the first ends 21aa, 21ba and the second ends 21ab, 21bb of the respective first and second interlayer connection members 21a, 21b, thereby enabling wind direction measurement.

(Modification 2)

Further, in the aforementioned wind direction meter 1 of the present embodiment, the sensor 2 is configured such that the two thermoelectric conversion elements 21 are disposed sandwiching the heater 22, while being serially connecting to each other via wiring (back surface pattern 29). However, in the wind direction meter 1 of the present embodiment, the sensor 2 may be configured such that the two thermoelectric conversion elements 21 are independently electrically connected to the control unit 3. However, in this case, wiring for establishing connection with the control unit 3 must be provided for each of the two thermoelectric conversion elements 21. Thus, it is preferable that the sensor 2 has the aforementioned configuration (the configuration in which two thermoelectric conversion elements 21 are serially connected).

Second Embodiment

Referring to FIGS. 9 to 13, a second embodiment of the present invention will be described. In the second embodiment, the heater 22 of the first embodiment has been changed to a Peltier element 320. Since the rest of the configuration is similar to the first embodiment, description is omitted herein.

Figure 9:
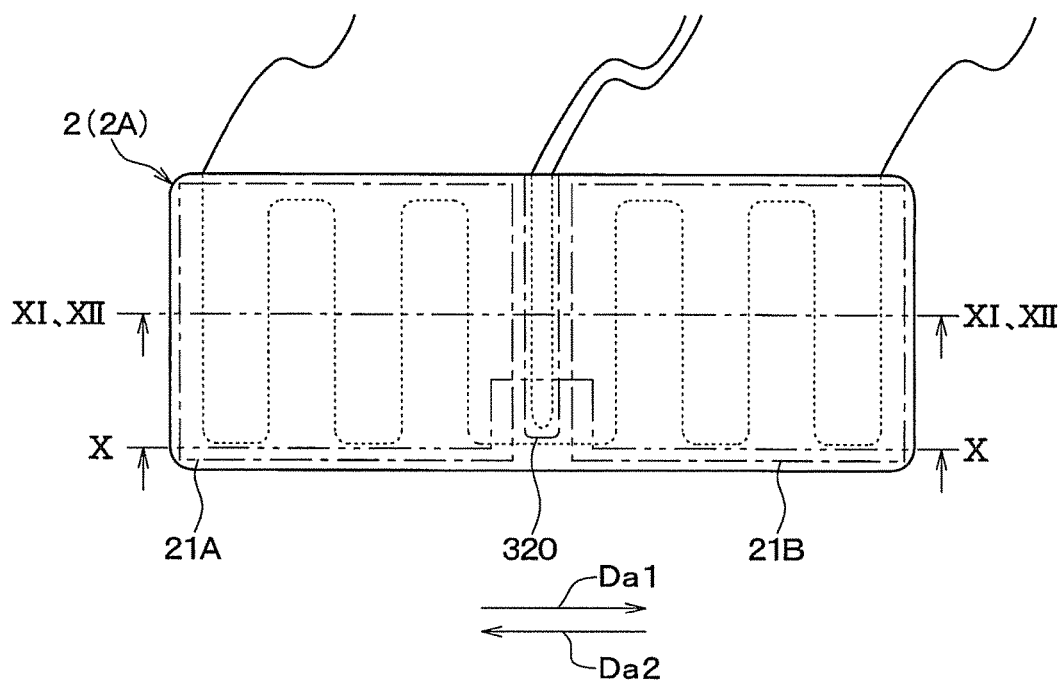
FIG. 9 is a plan view of a sensor 2, according to a second embodiment.
Figure 10:
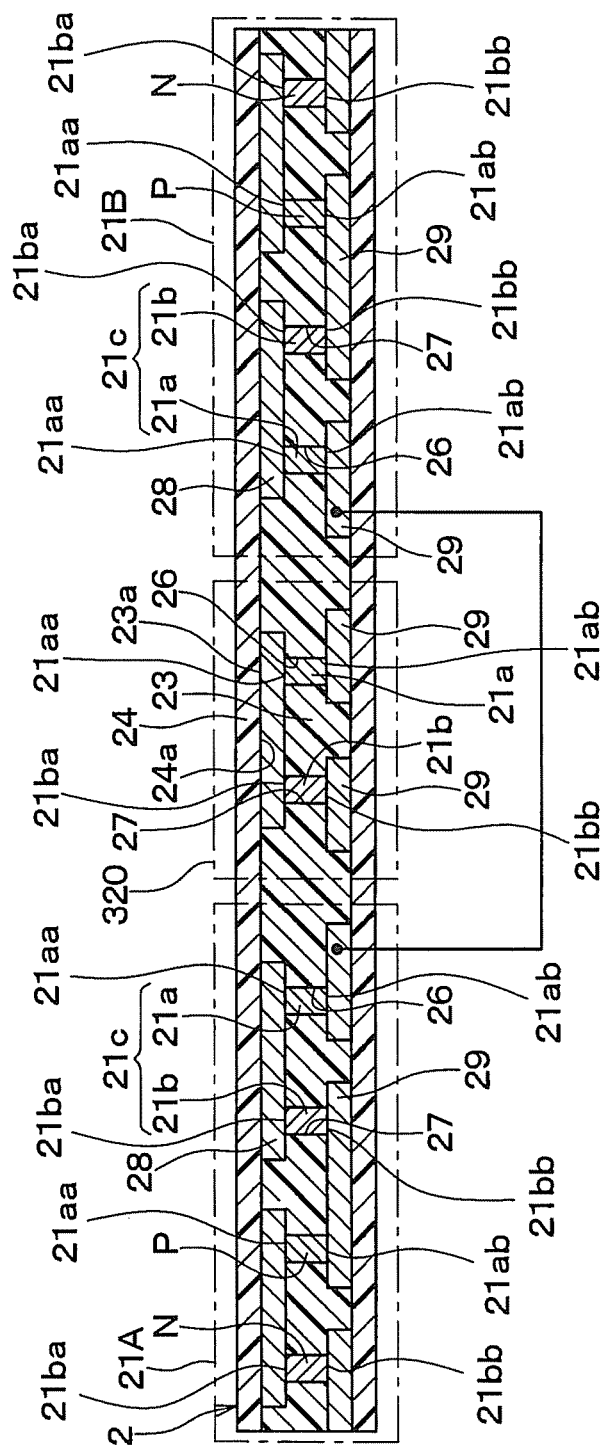
FIG. 10 is a cross-sectional view taken along the line X-X of FIG. 9.

The wind direction meter 1 of the first embodiment is configured to include the heater 22 as the temperature changing unit, but the wind direction meter 1 according to the present embodiment is configured to include, as shown in FIGS. 9 and 10, a Peltier element 320 as the temperature changing unit.

Further, the wind direction meter 1 of the first embodiment is configured by covering the entirety of the second surface 2b of the sensor 2 with the fixing member 5 so that the wind does not flow to the second surface 2b side of the sensor 2. The present embodiment however is configured such that the wind can flow to the second surface 2b side of the sensor 2 (not only the first surface 2a). Specifically, although not shown, it is so configured, as an example, that a spacer is provided between each of the plurality of sensors 2 and the fixing member 5, and only a part of the second surface 2b is covered by the spacer in each of the plurality of sensors 2.

The Peltier element 320 is a heat source which generates both heat and cold. As shown in FIG. 9, the Peltier element 320 is formed on a multilayer substrate together with the first and second thermoelectric conversion elements 21A, 21B in each of the plurality of sensors 2. In the present embodiment, the Peltier element 320 has a structure similar to that of the first thermoelectric conversion element 21A. Namely, the Peltier element 320 includes a first interlayer connection member 21a and a second interlayer connection member 21b, with the first and second interlayer connection members 21a and 21b being serially connected to each other via wiring (front surface pattern 28), for electrical connection to the control unit 3.

Figure 11:
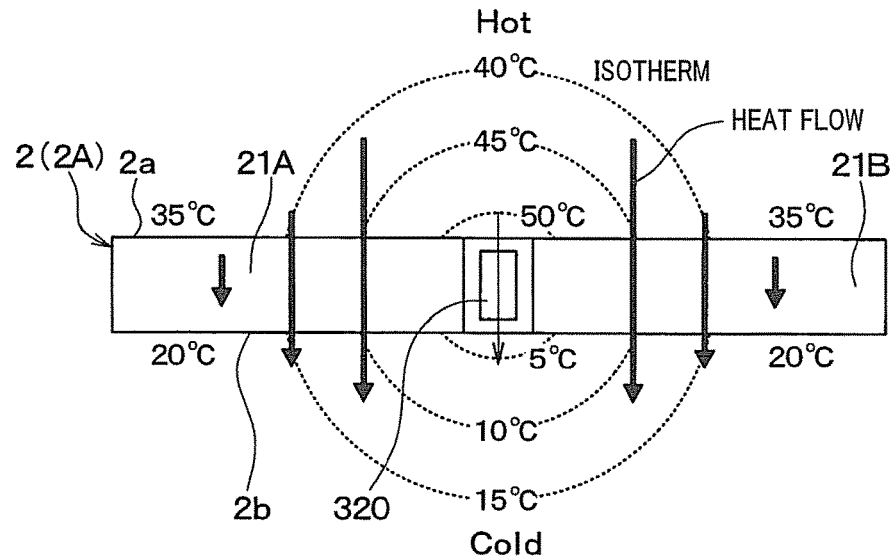
FIG. 11 is a schematic diagram illustrating temperature distribution in the vicinity of the sensor 2 when there is no wind, according to the second embodiment and corresponding to the cross-section taken along the line XI-XI of FIG. 9.

In the present embodiment, the first ends 21aa, 21ba of the respective first and second interlayer connection members 21a, 21b constituting the Peltier element 320 are disposed on the first surface 2a side of the sensor 2. Further, the second ends 21ab, 21bb of the respective first and second interlayer connection members 21a, 21b constituting the Peltier element 320 are disposed on the second surface 2b side of the sensor 2. In the Peltier element 320 of the present embodiment, when electric power is supplied to the first and second interlayer connection members 21a, 21b, heat is generated at the first ends 21aa, 21ba of the first and second interlayer connection members 21a, 21b, but heat is absorbed at the second ends 21ab, 21bb of the first and second interlayer connection members 21a, 21b. Therefore, as shown in FIG. 11, in the Peltier element 320 of the present embodiment, when electric power is supplied to the first and second interlayer connection members 21a, 21b, the first surface 2a side of the sensor 2 generates heat, and the second surface 2b side of the sensor 2 absorbs heat. In this way, the Peltier element 320 includes the first and second interlayer connection members 21a, 21b with the first ends 21aa, 21ba serving as the first temperature changing unit being disposed on the first surface 2a to conduct heat generation or heat absorption. Further, the Peltier element 320 includes the first and second interlayer connection members 21a, 21b with the second ends 21ab, 21bb serving as the second temperature changing unit being disposed on the second surface 2b side to conduct heat generation or heat absorption which is not being conducted by the first temperature changing unit. The present embodiment may be configured to include a heater to serve as either the first temperature changing unit or the second temperature changing unit, and include a cooler as a separate member from the heater to serve as the other unit.

Further, the first ends 21*aa*, 21*ba* of the respective first and second interlayer connection members 21*a* and 21*b* configuring the first and second thermoelectric conversion elements 21A, 21B are disposed on the first surface 2*a* side of the sensor 2. Further, the second ends 21*ab*, 21*bb* of the respective first and second interlayer connection members 21*a* and 21*b* configuring the first and second thermoelectric conversion elements 21A, 21B are disposed on the second surface 2*b* side of the sensor 2.

The sensor 2 of the present embodiment can be produced by the method of producing the sensor 2 described in the first embodiment, with a change in that the region for configuring the Peltier element 320 in the sensor 2 is electrically independent of the first thermoelectric conversion element 21A, while having the same structure as the first thermoelectric conversion element 21A.

As shown in FIG. 11, when measuring the wind direction with the wind direction meter 1 of the present embodiment, the Peltier element 320 is activated to generate heat on the first surface 2*a* side of the sensor 2 and to absorb heat on the second surface 2*b* side of the sensor 2.

As shown in FIG. 11, when there is no wind, the temperature distribution shown with the isotherm of FIG. 11 is formed in the air (or the wind) on the first surface 2*a* side of the sensor 2, while forming the temperature distribution shown with the isotherm of FIG. 11 in the fixing member 5 on the second surface 2*b* side of the sensor 2, with the transmission of the heat of the Peltier element 320. The present embodiment uses the Peltier element 320 as the temperature changing unit, and thus, when there is no wind, the first surface 2*a* side of the sensor 2 will have a high temperature and the second surface 2*b* side of the sensor 2 will have a cool temperature, as shown in the isotherm of FIG. 11, due to the absorption and generation of heat of the Peltier element 320. Specifically, the first surface 2*a* side of the sensor 2 is formed with a temperature distribution in which an area closer to the Peltier element 320 has a higher temperature, and the second surface 2*b* side of the sensor 2 is formed with a temperature distribution in which an area closer to the Peltier element 320 has a lower temperature. Therefore, the closer the approach is to the Peltier element 320, the greater the temperature difference becomes between the first surface 2*a* side and the second surface 2*b* side.

In this way, in the sensor 2 of the present embodiment, if there is no wind, a temperature difference is generated between the first surface 2*a* side and the second surface 2*b* side. However, in the sensor 2 of the present embodiment, the structures of the two thermoelectric conversion elements 21 are linearly symmetric with respect to the Peltier element 320 as an axis. Therefore, in the sensor 2 of the present embodiment as well, when there is no wind, the heat generated from the Peltier element 320 is transmitted equally, as shown in the isotherm of FIG. 11, to both sides (the two thermoelectric conversion elements 21) sandwiching the Peltier element 320. Accordingly, the temperature difference between both ends (between the first ends 21*aa*, 21*ba* and the respective second ends 21*ab*, 21*bb*) becomes equivalent in the two corresponding first and second interlayer connection members 21*a*, 21*b* symmetrically disposed sandwiching the Peltier element 320. Further, a reverse relationship is established in respect of the level of temperature and the polarity of electromotive force in the same manner as in the first embodiment. Thus, in the present embodiment as well, when there is no wind, the entirety of the electromotive force of the plurality of sensors 2 becomes zero.

Figure 12:
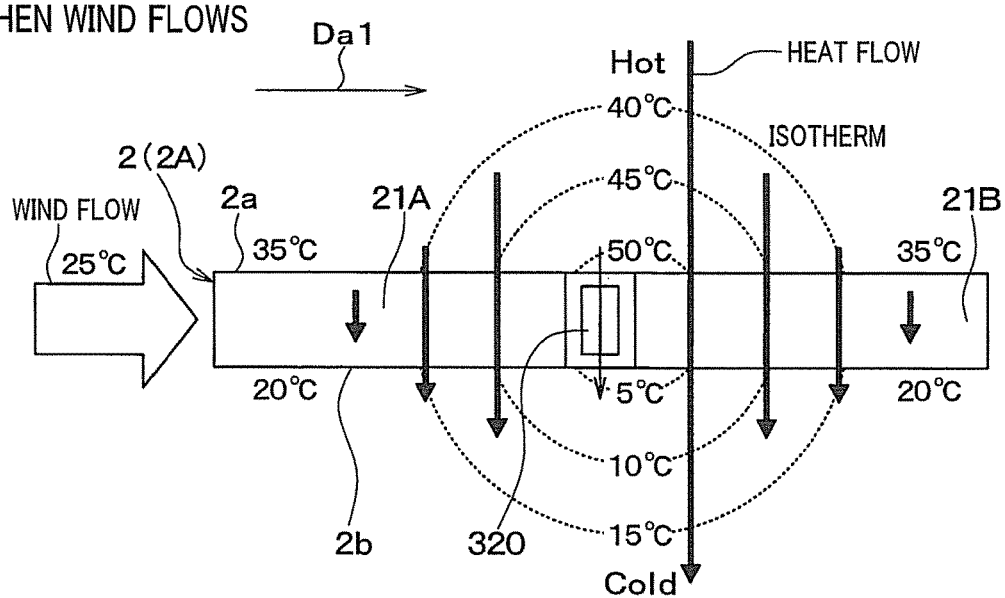
FIG. 12 is a diagram illustrating temperature distribution in the vicinity of the sensor 2 when wind flows, according to the second embodiment and corresponding to the cross-section taken along the line XII-XII of FIG. 9.

As shown in FIG. 12, when the wind to be measured flows, the temperature distribution shown by the isotherm of FIG. 12 is formed in the air (or the wind) on the first surface 2*a* side of the sensor 2, and the temperature distribution shown by the isotherm of FIG. 12 is formed in the air (or the wind) on the second surface 2*b* side of the sensor 2. In the present embodiment as well, when the wind as an object to be measured flows, the high temperature air (hereinafter, referred to as the hot air) on the first surface 2*a* side in the surrounding air whose temperature has been changed by the Peltier element 320 is moved by the wind in the direction (the right direction in FIG. 12) parallel to the first surface 2*a* in the same manner as in the first embodiment. In this case, in the present embodiment, the wind also flows as stated above to the second surface 2*b* side of the sensor 2, and thus the low temperature air (hereinafter, referred to as cold air) on the second surface 2*b* side in the surrounding air whose temperature has been changed by the Peltier element 320 is also moved in the direction parallel to the first surface 2*a* similarly to the hot air.

Figure 13:
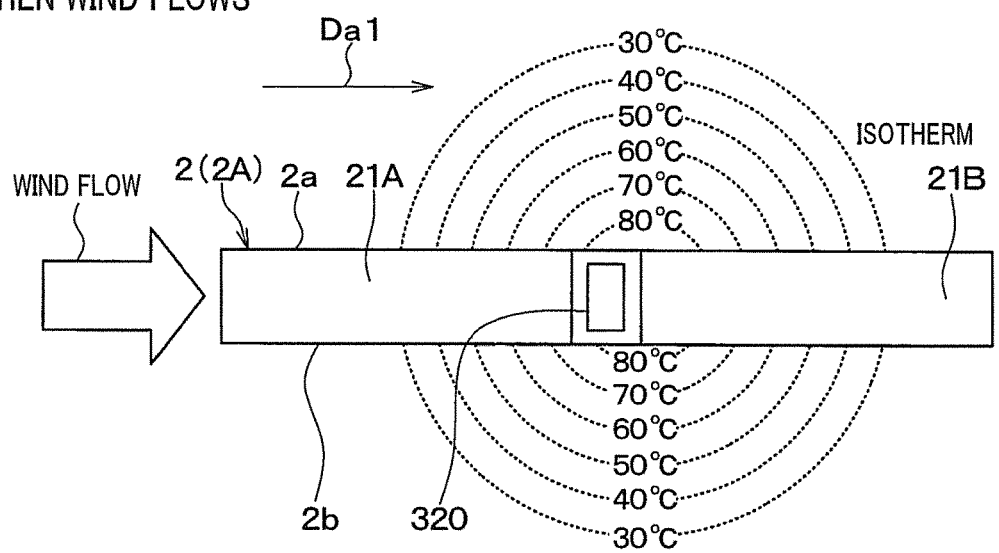
FIG. 13 is a diagram illustrating temperature distribution in the vicinity of a sensor 2 when wind flows, according to Comparative Example 1.

As shown in FIG. 13, when the heater 22 is provided as the temperature changing unit, no temperature difference is produced (temperature difference is hardly produced) between both ends of the first and second interlayer connection members 21*a*, 21*b*. Namely, when there is no wind, a temperature distribution in which an area closer to the heater 22 has a higher temperature is formed on both of the first and second surface 2*a*, 2*b*. Accordingly, when the temperature distribution on both surfaces 2*a*, 2*b* is shifted by the wind, no temperature difference is produced (temperature difference is hardly produced) between both ends of the first and second interlayer connection members 21*a*, 21*b*. Therefore, in this case, the electromotive force of the sensor 2 is not produced, and the wind direction cannot be detected.

In this regard, when there is no wind, the present embodiment enables formation of a temperature distribution on the first surface 2*a* side of the sensor 2, as stated above, in which an area closer to the Peltier element 320 has a higher temperature, and enables formation of a temperature distribution on the second surface 2*b* side in which an area closer to the Peltier element 320 has a lower temperature. Thus, the closer the approach is to the Peltier element 320, the greater the temperature difference becomes between the first surface 2*a* side and the second surface 2*b* side. Moreover, as shown in FIG. 12, when the temperature distribution of both surfaces 2*a*, 2*b* is shifted by the wind, a portion having a particularly large temperature difference in the temperature distribution is located in the second thermoelectric conversion element 21B which is located further downstream of the wind than the Peltier element 320 is. Therefore, in the second thermoelectric conversion element 21B, the temperature difference between both ends of the first and second interlayer connection members 21*a*, 21*b* becomes large compared to the case when there is no wind. On the one hand, as shown in FIG. 12, the temperature difference between both ends of the first and second interlayer connection members 21*a*, 21*b* becomes small in the first thermoelectric conversion element 21A which is located further upstream of the wind than the Peltier element 320 is, compared to the case when there is no wind. As a result, a positive electromotive force is generated in the sensor 2, the positive electromotive force being a combination of the electromotive force produced by the first thermoelectric conversion element 21A and the electromotive force produced by the second thermoelectric conversion element 21B.

In this way, the wind direction meter 1 of the present embodiment can measure the direction of the wind without being provided with a fixing member 5, even when the air on the second surface 2b side in the air whose temperature has been changed by the temperature changing unit is moved by the wind and the like as an object to be measured.

Third Embodiment

With reference to FIGS. 14 to 36, a third embodiment of the present invention will be described. In the present embodiment, the configuration of the sensor 2 is changed from that of the first embodiment. The rest of the configuration is similar to the first embodiment, and thus description is omitted. In the third embodiment as well, a spacer is provided between each of the plurality of sensors 2 and the fixing member 5 so that the wind can also flow to the second surface 2b (not only the first surface 2a) side of the sensor 2.

First, a specific structure of the sensor 2 according to the present embodiment will be described with reference to FIGS. 14 to 17 and FIG. 19. It should be noted that FIG. 15 is an enlarged view of a portion A surrounded by the dashed line of FIG. 14, and FIGS. 16 to 20 correspond to the enlarged view (As shown in FIG. 14, the entirety of the sensor 2 actually has a curved shape, but in FIGS. 15 to 20, the sensor 2 is in a linear shape for the sake of convenience.).

Figure 14:
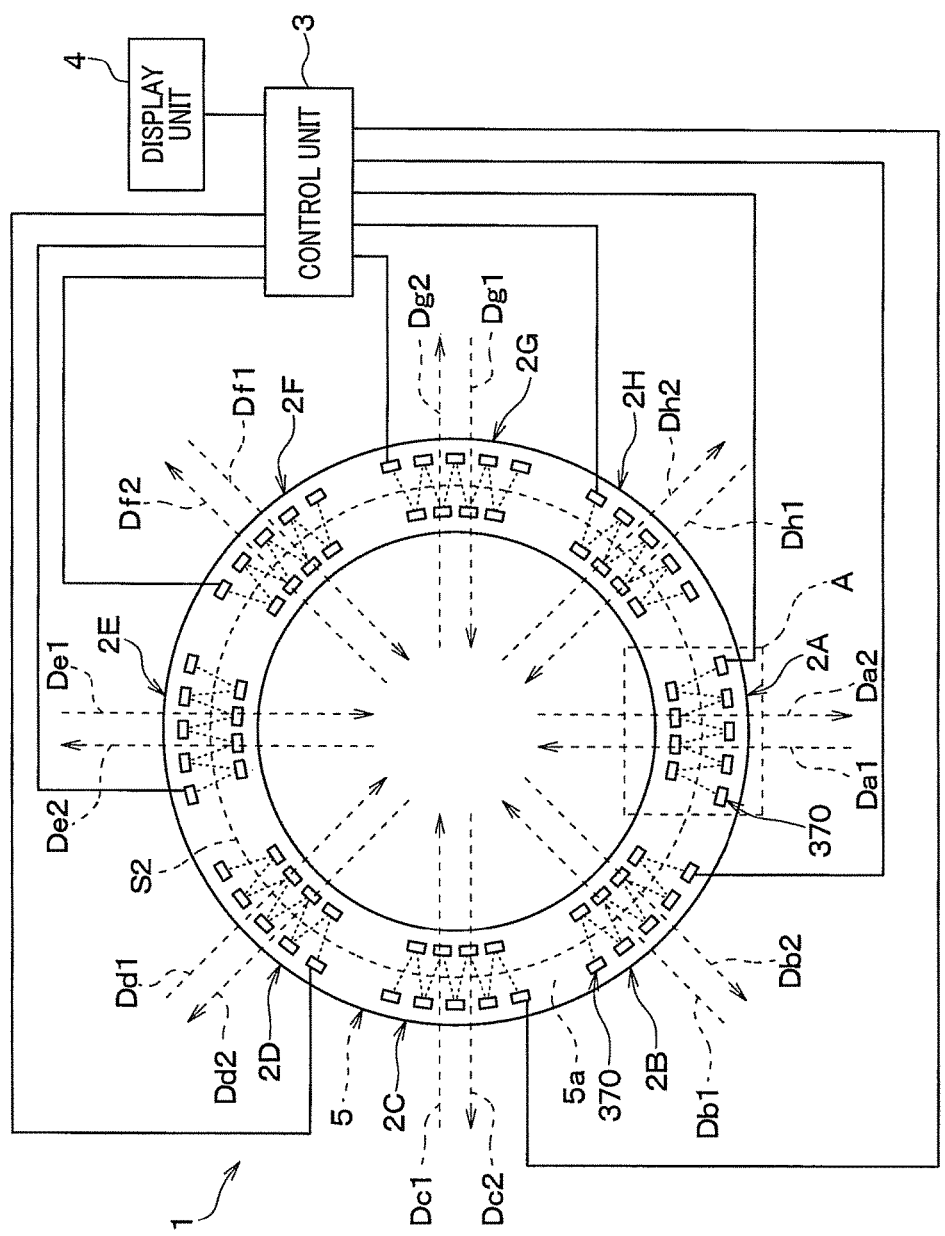
FIG. 14 is a diagram illustrating a planar configuration of a wind direction meter 1, according to a third embodiment.
Figure 15:
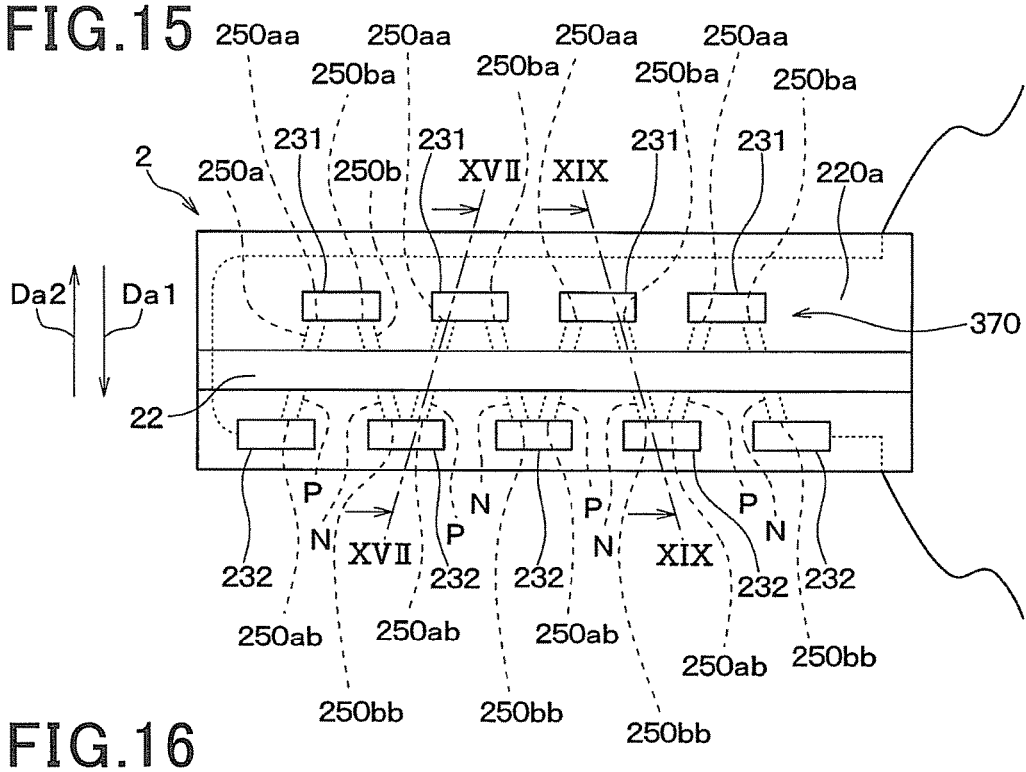
FIG. 15 is a plan view of the sensor 2 shown in FIG. 14.

As shown in FIG. 14, in the present embodiment, all of the plurality of sensors 2 are arranged inside a multilayer substrate along the direction of the circumference (refer to dashed line S2 of FIG. 14) centered on a line perpendicular to the plane 5a (refer to FIG. 1). Therefore, the plurality of sensors 2 are disposed being offset from each other in the rotation direction centered on a line perpendicular to the plane 5a in the same manner as in the first embodiment, etc. Further, the plurality of sensors 2 are disposed at different positions on the circumference (refer to dashed line S2 of FIG. 14) centered on a line perpendicular to the plane 5a. Specifically, eight sensors 2 are disposed at even intervals on the circumference S2. Thus, although the details will be described below, the wind direction meter 1 of the present embodiment can calculate the direction of the wind in a plurality of directions in the same manner as in the first embodiment.

Figure 17:
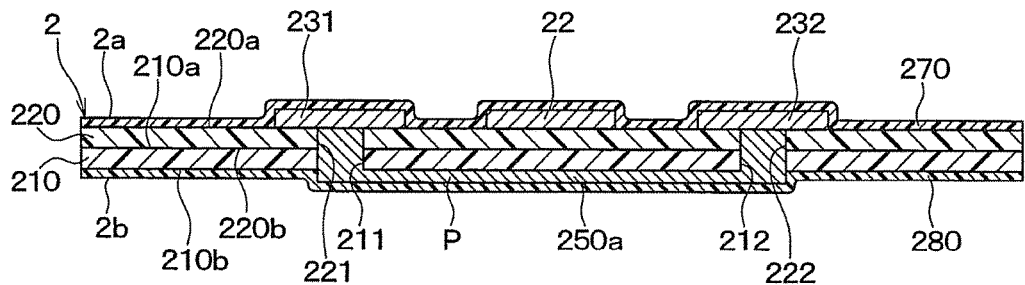
FIG. 17 is a cross-sectional view taken along the line XVII-XVII of FIG. 15.
Figure 19:
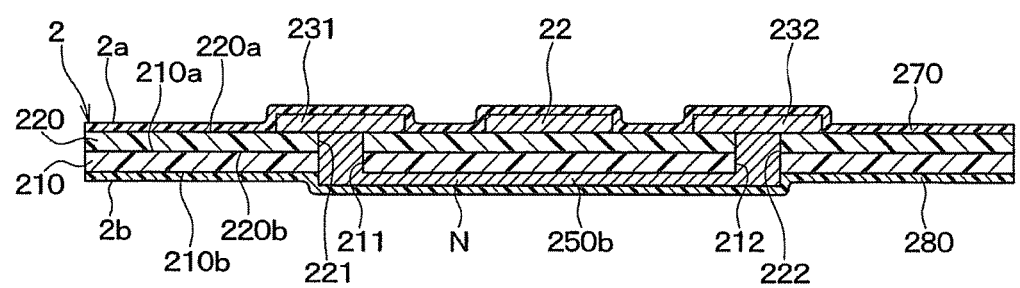
FIG. 19 is a cross-sectional view taken along line XIX-XIX of FIG. 15.

As shown in FIGS. 17 and 19, the sensor 2 is configured by a multilayer substrate which is a laminate that is an integration of a first insulating layer 210, a second insulating layer 220 disposed on a surface 210a of the first insulating layer 210, a front surface protective layer 270 disposed on a surface 220a of the second insulating layer 220, and a back surface protective layer 280 disposed on a back surface 210b of the first insulating layer 210. The first insulating layer 210, the second insulating layer 220, the front surface protective layer 270 and the back surface protective layer 280 are each made of a thermoplastic resin film similarly to the insulating base material 23, the front surface protective member 24, and the back surface protective member 25 of the first embodiment. The first insulating layer 210 and the second insulating layer 220 correspond to the insulating base material 23 of the first embodiment. The front surface protective layer 270 corresponds to the front surface protective member 24 of the first embodiment. The back surface protective layer 280 corresponds to the back surface protective member 25 of the first embodiment.

First connection patterns 231, the heater 22 and second connection patterns 232 are disposed on the surface 220a of the second insulating layer 220. The first connection patterns 231 and the second connection patterns 232 are patterned in a thin film conductor such as a copper foil. The heater 22 is a heat source which emits heat, and is configured by a heating wire, a thin film resistor, and the like. The first connection patterns 231 correspond to the front surface patterns 28 of the first embodiment. The second connection patterns 232 correspond to the back surface patterns 29 of the first embodiment.

As shown in FIG. 15, the heater 22 is in a shape extending long in one direction. The first connection patterns 231 are disposed on one side of the heater 22, i.e., the upper side of FIG. 15, and several first connection patterns 231 are disposed spaced apart from each other along the longitudinal direction of the heater 22. Similarly, the second connection patterns 232 are disposed on the other side of the heater 22, i.e., the bottom side of FIG. 15, and several second connection patterns 232 are disposed spaced apart from each other along the longitudinal direction of the heater 22. In the present embodiment, the distance from the heater 22 in a direction perpendicular to the longitudinal direction of the heater 22 to the first connection patterns 231 is the same as the distance from the heater 22 to the second connection patterns 232.

As shown in FIGS. 17 and 19, on the back surface 210b of the first insulating layer 210, there are formed a P-type thin film element 250a and an N-type thin film element 250b. The P-type element 250a corresponds to the first interlayer connection member 21a of the first embodiment, and the N-type element 250b corresponds to the second interlayer connection member 21b of the first embodiment. Namely, the P-type element 250a corresponds to the first conductor in the claims, and the N-type element 250b corresponds to the second conductor in the claims.

Therefore, in the present embodiment, the portion configured by the P-type element 250a and the N-type element 250b serves as a thermoelectric conversion element 370 which generates an electromotive force in conformity with the temperature difference between both ends. In the cross-section shown in FIGS. 17 and 19, the sensor 2 of the present embodiment is also configured to be linearly symmetric with respect to the heater 22 as an axis.

Figure 16:
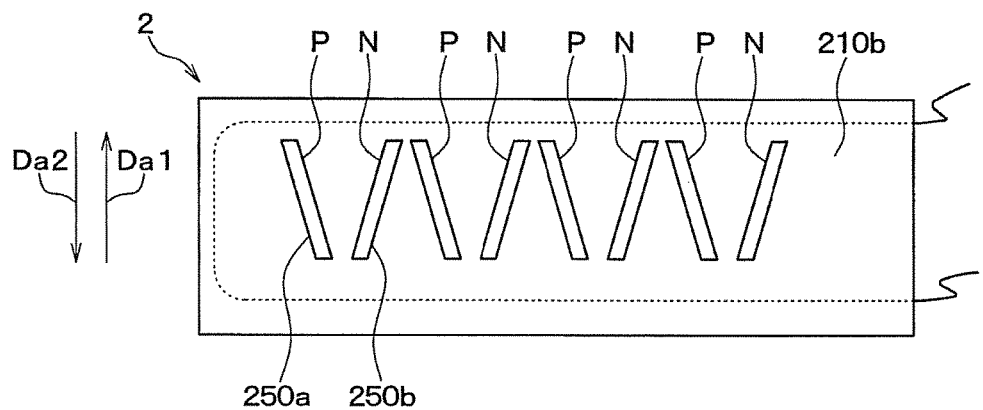
FIG. 16 is a bottom view of the sensor 2 shown in FIG. 14.

As shown in FIGS. 15 and 16, a P-type element 250a and an N-type element 250b are each in a shape extending from the first end side to a second end side so that both ends are positioned on both sides of the heater 22, i.e. positioned sandwiching the heater 22. FIG. 16 is a plan view of the back side of the multilayer substrate of FIG. 15, and is vertically inverted with respect to FIG. 15. Several P-type elements 250a and N-type elements 250b are alternately disposed along the longitudinal direction of the heater 22.

Further, as shown in FIGS. 15 and 16, a P-type element 250a and an N-type element 250b that are adjacent to each other both have first ends connected to a common first connection pattern 231. Thus, the P-type element 250a is connected to the N-type element 250b. Further, a P-type element 250a and an N-type element 250b that are adjacent to each other but are not connected to a common first connection pattern 231 have second ends connected to a common second connection pattern 232. Thus, when a P-type element 250a and an N-type element 250b connected to each other are defined to be a pair, a plurality of pairs of P-type element 250a and N-type element 250b are connected in series. In the present embodiment, a pair of P-type element 250a and N-type element 250b connected to each other constitute a thermoelectric conversion element 370.

As shown in FIG. 17, a P-type element 250a is connected to a first connection pattern 231 through vias 211, 221 which are formed in the first and second insulating layers 210, 220 so as to be located right beneath the first connection pattern 231. Similarly, the P-type element 250a is connected to a second connection pattern 232 through vias 212, 222 which are formed in the first and second insulating layers 210, 220 so as to be located right beneath the second connection pattern 232.

Further, as shown in FIG. 19, an N-type element 250b is connected to a first connection pattern 231 through vias 211, 221 which are formed in the first and second insulating layers 210, 220 so as to be located right beneath the first connection pattern 231. Similarly, the N-type element 250b is connected to a second connection pattern 232 through vias 212, 222 which are formed in the first and second insulating layers 210, 220 so as to be located right beneath the second connection pattern 232.

As shown in FIG. 15, the P-type element 250a and the N-type element 250b respectively have mutually connected first ends 250aa, 250ba and second ends 250ab, 250bb which are positioned on opposite sides sandwiching the heater 22. Further, in the sensor 2 of the present embodiment, the first end 250aa of the P-type element 250a and the first end 250ba of the N-type element 250b are positioned upstream of the direction Da1 in which the wind flows. Further, the second end 250ab of the P-type element 250a and the second end 250bb of the N-type element 250b are positioned downstream of the direction Da1 in which the wind flows. Thus, in the sensor 2 of the present embodiment, the first ends 250ba, 250ba are positioned upstream of the wind and the second ends 250ab, 250bb are positioned downstream of the wind.

Further, in the sensor 2 of the present embodiment, the insulating base material 23, the front surface protective member 24, and the back surface protective member 25, which are each made of a thermoplastic resin, have flexibility. Therefore, the sensor 2 of the present embodiment can be easily formed into a curved shape as shown in FIG. 14. The basic configuration of the sensor 2 of the present embodiment has so far been described.

Figure 18:
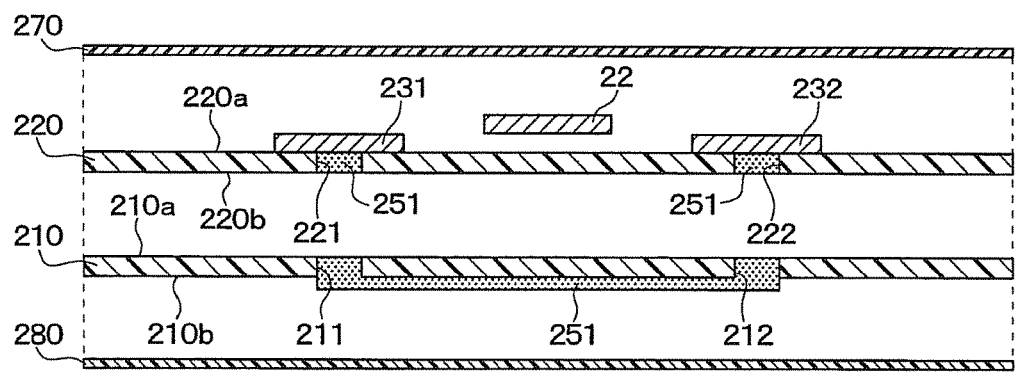
FIG. 18 is a cross-sectional view illustrating steps of producing the sensor 2, according to the third embodiment and corresponding to FIG. 17.
Figure 20:
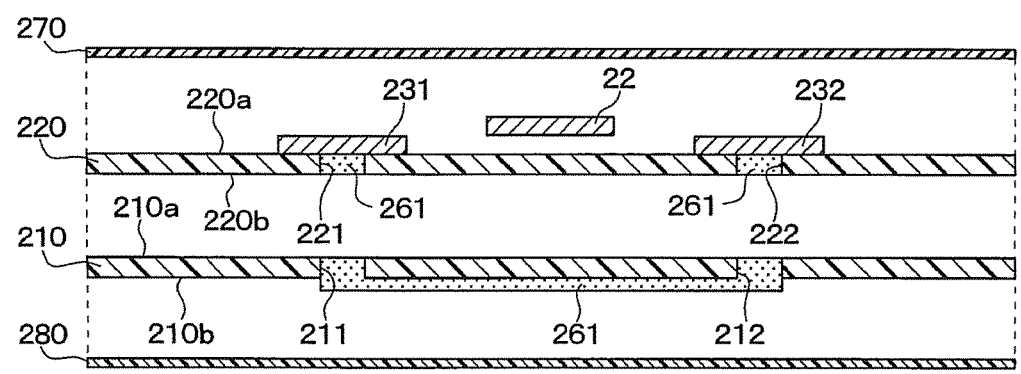
FIG. 20 is a cross-sectional view illustrating steps of producing the sensor 2, according to the third embodiment and corresponding to FIG. 17.
Figure 23:
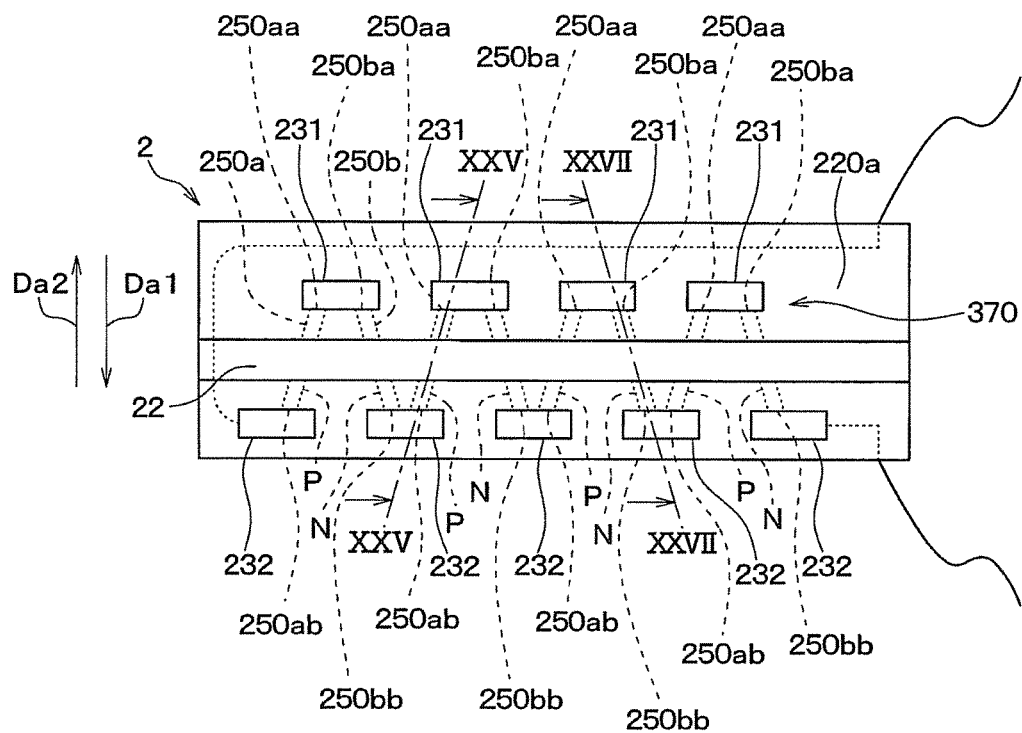
FIG. 23 is a plan view illustrating a sensor 2, according to Modification 1 of the third embodiment.
Figure 24:
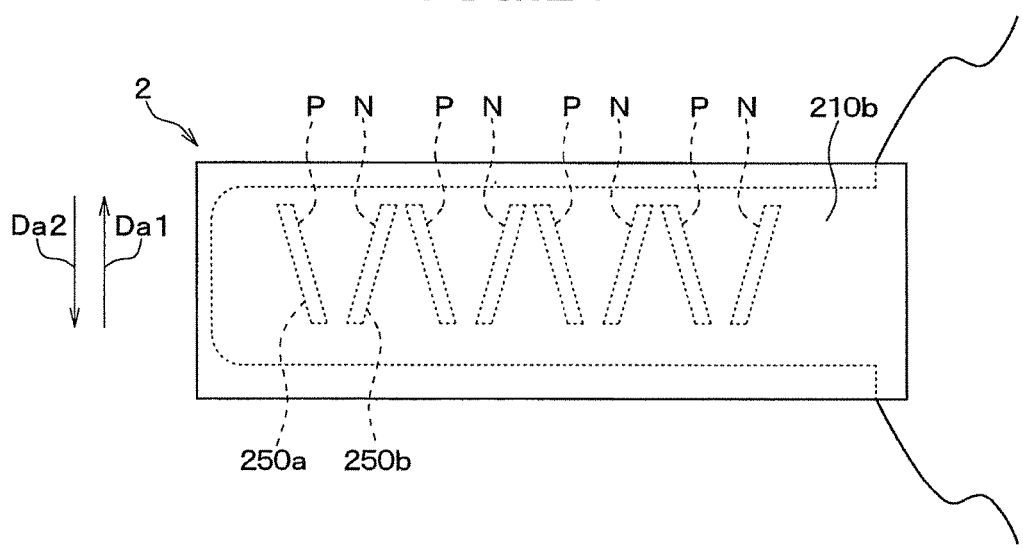
FIG. 24 is a bottom view illustrating the sensor 2 shown in FIG. 23.
Figure 25:
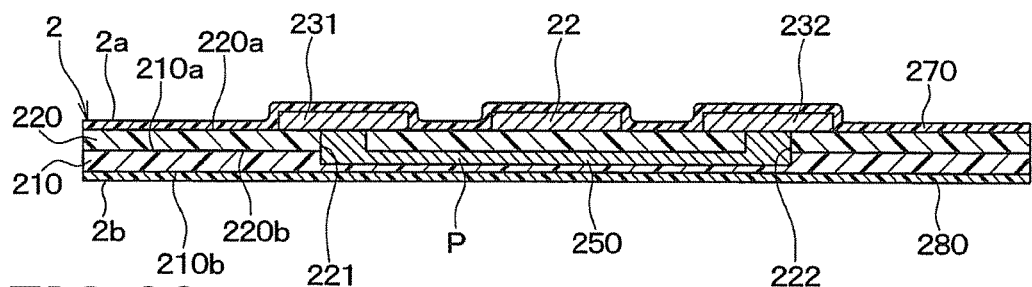
FIG. 25 is a cross-sectional view taken along line XXV-XXV of FIG. 23.

Referring now to FIGS. 18 to 20, hereinafter will be described a method of producing the sensor 2 of the present embodiment.

As shown in FIGS. 18 and 20, the materials used in the method are the first insulating layer 210 which is formed with a pattern of a P-type element material 251 and an N-type element material 261, the second insulating layer 220 in which the P-type element material 251 and the N-type element material 261 are filled in the vias 221, 222, the front surface protective layer 270, and the back surface protective layer 280. The P-type element material 251 and the N-type element material 261 respectively correspond to the first conductive paste 21d and the second conductive paste 21e of the first embodiment.

In the same manner as in the first embodiment, a laminate is formed by laminating the back surface protective layer 280, the first insulating layer 210, the second insulating layer 220 and the front surface protective layer 270 in this order, followed by heating with an application of pressure for integration of the laminate. When the laminate is heated for integration, the P-type element material 251 and the N-type element material 261 are solid-phase sintered to form the P-type element 250a and the N-type element 250b. This is how the sensor 2 of the present embodiment is produced.

Referring to FIGS. 21 and 22, hereinafter will be described a method of measuring the wind direction using the wind direction meter 1 of the present embodiment. FIGS. 21 and 22 each correspond to FIG. 17, with an omission of the front surface protective layer 270 and the back surface protective layer 280 of FIG. 17.

When measuring the wind direction with the wind direction meter 1 of the present embodiment, the heater 22 is activated to generate heat.

Initially, operation of each sensor 2 will be described.

First, the case when there is no wind will be described. As shown in FIG. 21, when there is no wind, a temperature distribution shown by the isotherm of FIG. 21 is formed in the air (or the wind) on the first surface 2a side of the sensor 2, while a temperature distribution shown by the isotherm of FIG. 21 is formed in the fixing member 5 on the second surface 2b side of the sensor 2, with the transmission of heat from the heater 22. The first surface 2a side of the sensor 2 will have a temperature in conformity with the temperature distribution of the air (wind) above the first surface 2a, and the second surface 2b side of the sensor 2 will have a temperature in conformity with the temperature distribution of the air (wind) below the second surface 2b. Specifically, a temperature distribution in which an area closer to the heater 22 has a higher temperature is formed on the first surface 2a side and the second surface 2b side of the sensor 2. The sensor 2 of the present embodiment also has a structure in which a linearly symmetric relationship is established with respect to the heater 22 as an axis. Therefore, as shown in the isotherm of FIG. 21, the sensor 2 of the present embodiment transmits the heat generated from the heater 22 equally to both sides sandwiching the heater 22 therebetween when there is no wind. As a result, the temperature difference becomes zero between corresponding both ends (first and second ends 250aa and 250ab of FIG. 21) of the P-type elements 250a, which are symmetrically positioned sandwiching the heater 22. Similarly, the temperature difference also becomes zero between corresponding both ends (first and second ends 250ba and 250bb) of the N-type elements 250b, which are symmetrically positioned sandwiching the heater 22. Therefore, the electromotive force in each of the plurality of sensors 2 becomes zero. Similarly, the electromotive force of each of the plurality of sensors 2 become zero when there is no wind.

The case when the wind (the wind flowing above the first surface 2a) as an object to be measured flows to the sensor 2 will be described by way of an example in which the wind in the direction of the arrow Da1 flows to a sensor 2A of FIG. 14. As shown in FIG. 22, when the wind as an object to be measured flows, a temperature distribution shown by the isotherm of FIG. 22 is formed in the air (or the wind) on the first surface 2a side of the sensor 2, while a temperature distribution shown by the isotherm of FIG. 22 is formed in the air (or the wind) on the second surface 2b of the sensor 2. In the present embodiment, when the wind flows above the first surface 2a, the air on the first surface 2a side (hereinafter, referred to as the first surface 2a side hot air) in the surrounding air whose temperature has been changed by the heater 22 is moved by the wind in the direction (the right direction of FIG. 22) parallel to the first surface 2a. Since the wind also flows to the second surface 2b side of the sensor 2, the high temperature air on the second surface 2b side in the surrounding air whose temperature has been changed by the heater 22 also moves in the direction parallel to the first surface 2a similarly to the first surface 2a side hot air. Therefore, when the wind flows over the wind direction meter 1 of the present embodiment, the temperature distributions of the air (or the wind) will change, as shown in FIG. 22, on the first surface 2a side and the second surface 2b side of the sensor 2.

As a result, in the sensor 2, as shown in FIG. 22, the first surface 2a side and the second surface 2b side on the right side (second end 250ab side) of FIG. 22 will have a high temperature immediately after the wind starts to flow, and accordingly, the second end 250ab of the P-type element 250a will have a high temperature. Further, in the thermoelectric conversion element 21 on the left side (first end 250aa side) of FIG. 22, the first surface 2a side and the second surface 2b side will have a low temperature, and accordingly, the first end 250aa of the P-type element 250a will have a low temperature. Therefore, in the present embodiment, immediately after the wind starts to flow, the thermoelectric conversion element 370 produces a temperature difference between the first end 250aa and the second end 250ab of the P-type element 250a. Further, although description is omitted, in the N-type element 250b as well, a temperature difference is produced between the first end 250ba and the second end 250bb on the second end 250bb side having a high temperature, and the first end 250ba side having a cold temperature, similarly to the P-type element 250a. Thus, the sensor 2 generates a positive electromotive force in conformity with the temperature difference at both ends 250aa, 250ab, 250ba 250bb. In the present sensor 2 as well, the wind flowing in the direction opposite to Da1 (arrow Da2 of FIG. 14) generates a negative electromotive force whose absolute value is equivalent to that of the electromotive force generated when the wind flows in the direction of Da1, similarly to the first embodiment.

In the present embodiment, one sensor 2 operates as described above. The direction of the wind, as an object to be measured, can be measured on the basis of the difference in electromotive force generated in each of the plurality of sensors 2, similarly to the method of detecting the wind direction described in the first embodiment.

(Modification 1)

The positioning of the P-type element 250a and the N-type element 250b in the lamination direction of the insulating layers may be changed in the wind direction meter 1 of the aforementioned embodiment. This will be described referring to FIGS. 23 to 25 and 27.

In the sensor 2 in question, the P-type element 250a and the N-type element 250b are disposed between the first insulating layer 210 and the second insulating layer 220.

Figure 26:
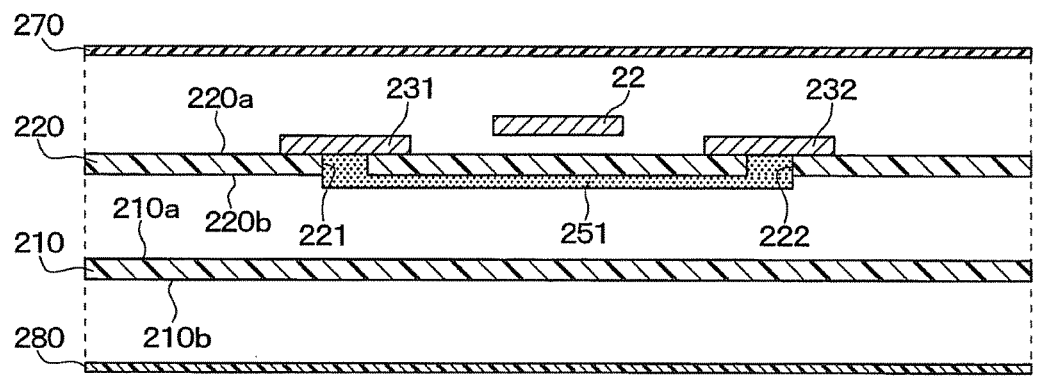
FIG. 26 is a cross-sectional view illustrating steps of producing the sensor 2, according to Modification 1 of the third embodiment and corresponding to FIG. 25.
Figure 27:
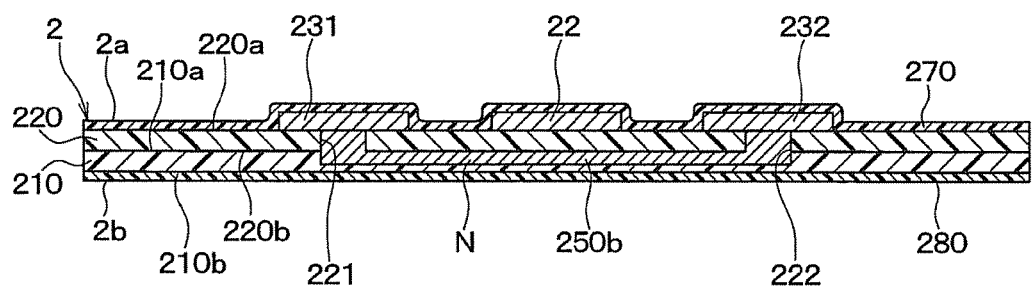
FIG. 27 is a cross-sectional view taken along the line XXVII-XXVII of FIG. 23.
Figure 28:
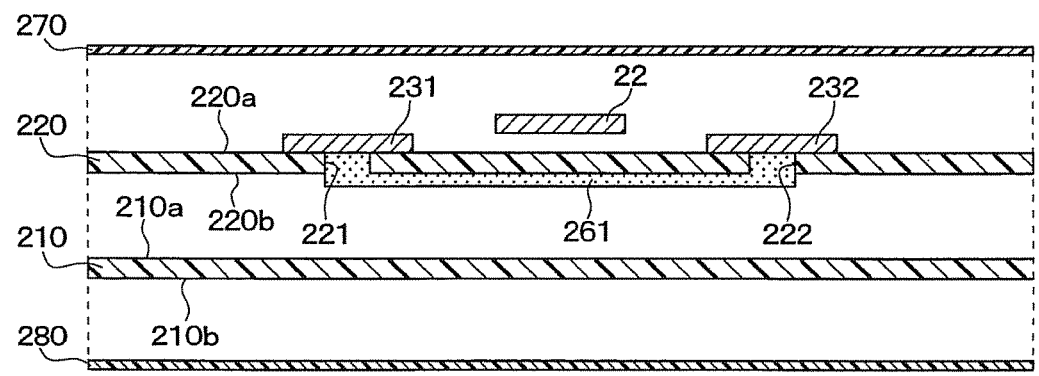
FIG. 28 is a cross-sectional view illustrating steps of producing the sensor 2, according to Modification 1 of the third embodiment and corresponding to FIG. 17.
Figure 29:
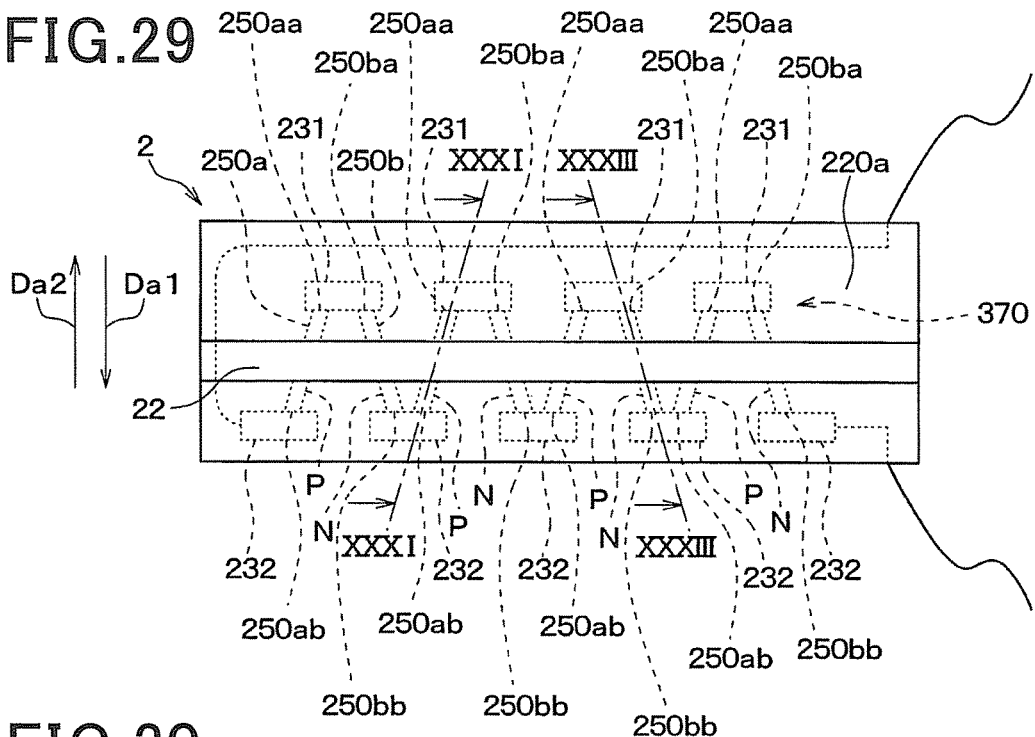
FIG. 29 is a plan view illustrating a sensor 2, according to Modification 2 of the third embodiment.
Figure 30:
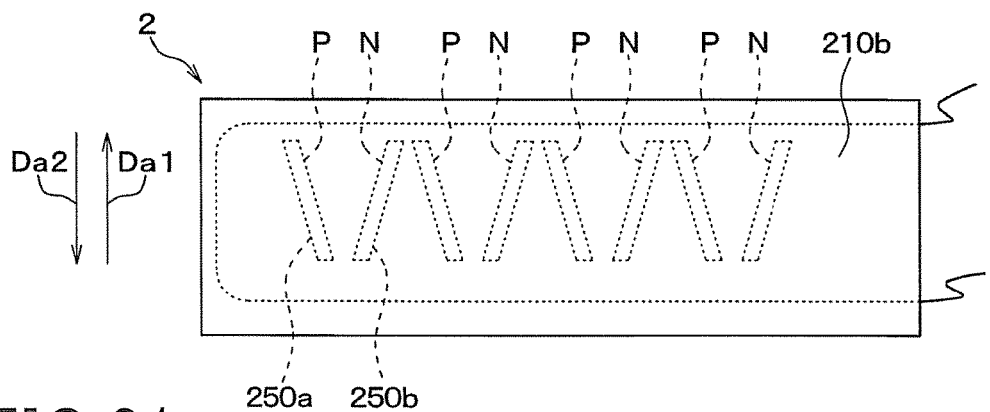
FIG. 30 is a bottom view illustrating the sensor 2 shown in FIG. 29.
Figure 31:
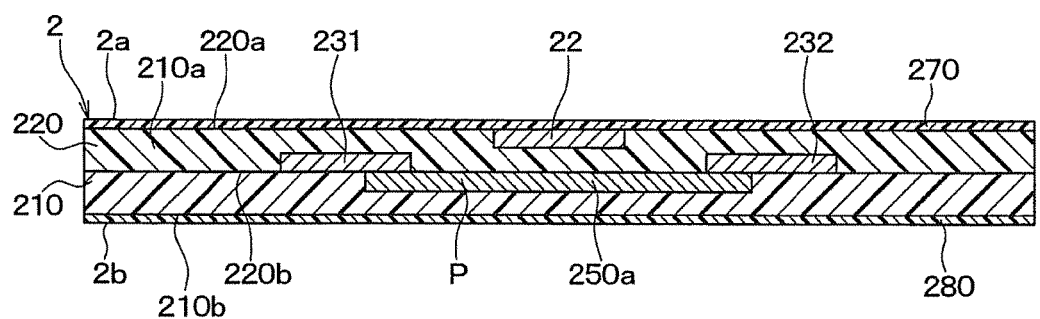
FIG. 31 is a cross-sectional view taken along the line XXXI-XXXI of FIG. 29.

The sensor 2 is produced as follows. As shown in FIGS. 26 and 28, the back surface protective layer 280, the first insulating layer 210, the second insulating layer 220, and the front surface protective layer 270 are used in producing the sensor 2. The second insulating layer 220 has the surface 220a formed with the first connection patterns 231 and the second connection patterns 232. Further, the second insulating layer 220 has the vias 221, 222 filled with the P-type element material 251 and the N-type element material 261, while having the back surface 220b formed with the patterns of the P-type element material 251 and the N-type element material 261. Moreover, the back surface protective layer 280, the first insulating layer 210, the second insulating layer 220, and the front surface protective layer 270 are laminated in this order to form a laminate, to which a pressure is applied while being heated to obtain an integrated laminate.

When the present sensor 2 is used as well, an electromotive force is produced similarly to the wind direction meter 1 of the aforementioned embodiment, and the direction of the wind can be measured. In the present embodiment, both of the P-type element 250a and the N-type element 250b are disposed between the first insulating layer 210 and the second insulating layer 220, but one of the P-type element 250a and the N-type element 250b may be disposed between the first insulating layer 210 and the second insulating layer 220, and the other of the P-type element 250a and the N-type element 250b may be disposed on the back surface 210b of the first insulating layer 210.

(Modification 2)

In the wind direction meter 1 of Modification 1 of the aforementioned embodiment, the disposition of the first and second connection patterns 231, 232 in the lamination direction of the insulating layers may be changed as shown in FIGS. 29 to 31 and 33.

In the sensor 2 in question, the first and second connection patterns 231, 232 are disposed between the first insulating layer 210 and the second insulating layer 220 in addition to the P-type element 250a and the N-type element 250b.

Figure 32:
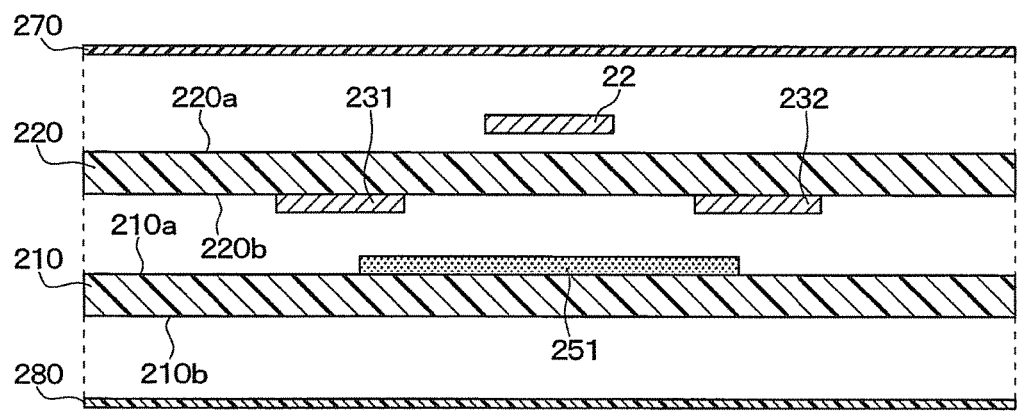
FIG. 32 is a cross-sectional view illustrating steps of producing the sensor 2, according to Modification 2 of the third embodiment and corresponding to FIG. 31.
Figure 33:
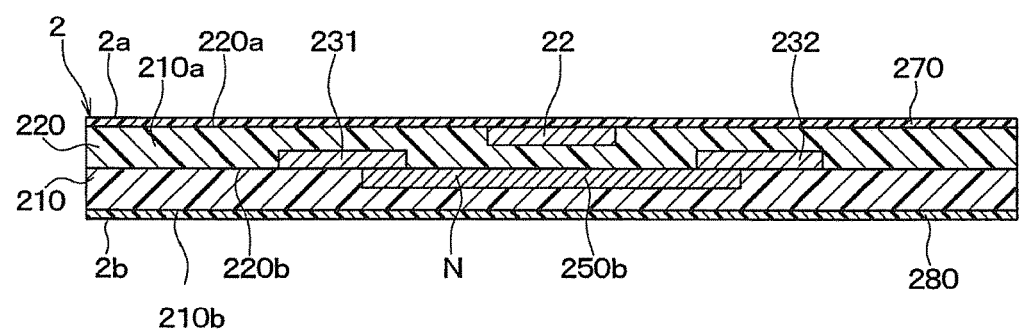
FIG. 33 is a cross-sectional view taken along the line XXXIII-XXXIII of FIG. 29.
Figure 34:
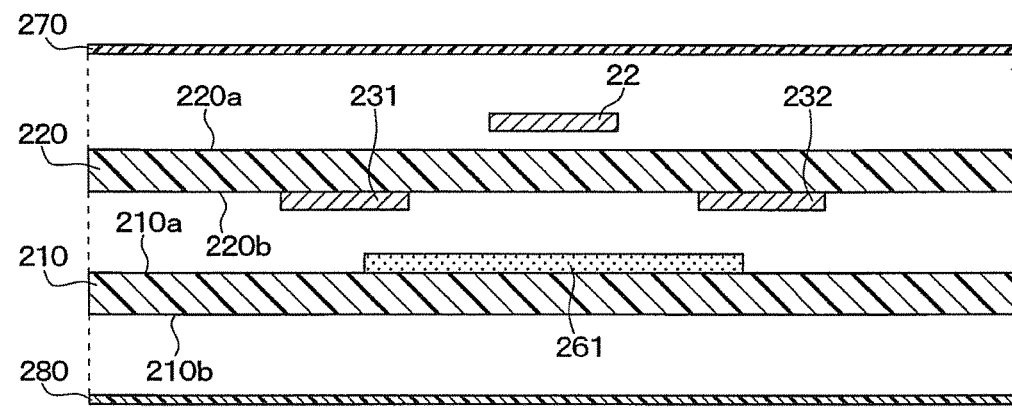
FIG. 34 is a cross-sectional view illustrating steps of producing the sensor 2, according to Modification 2 of the third embodiment and corresponding to FIG. 33.

The sensor 2 is produced as follows. As shown in FIGS. 32 and 33, the back surface protective layer 280, the first insulating layer 210, the second insulating layer 220, and the front surface protective layer 270 are used in the production. The first insulating layer 210 has the surface 210a where the patterns of the P-type element material 251 and the N-type element material 261 are formed. The second insulating layer 220 has the back surface 220b where the first and second connection patterns 231, 232 are formed. Further, the second insulating layer 220 has the surface 220a where the heater 22 is disposed. The back surface protective layer 280, the first insulating layer 210, the second insulating layer 220 and the front surface protective layer 270 are laminated in this order to form a laminate, to which a pressure is applied while being heated to integrate the laminate.

Figure 35:
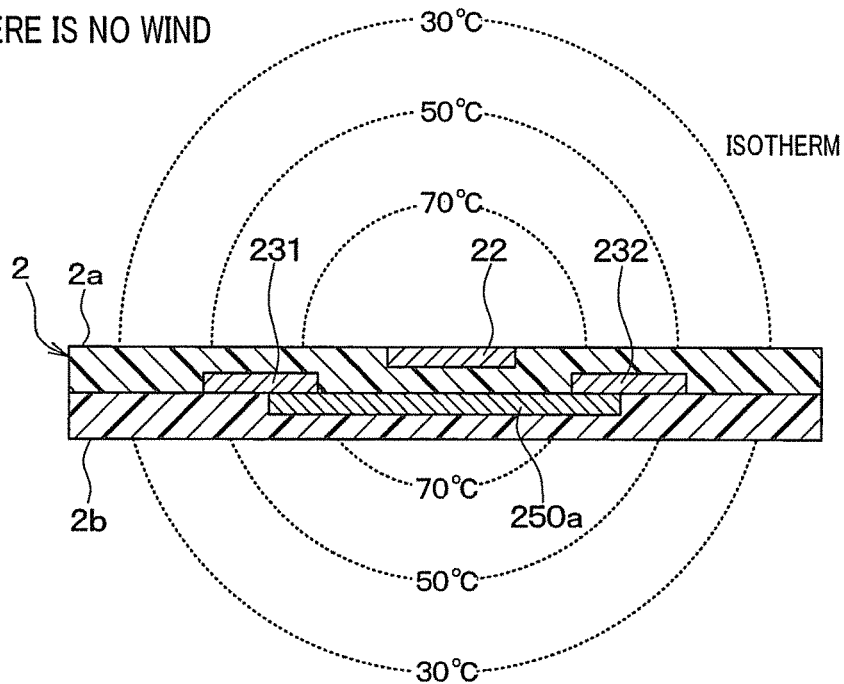
FIG. 35 is a diagram illustrating temperature distribution in the vicinity of the sensor 2 when there is no wind, according to Modification 2 of the third embodiment.
Figure 36:
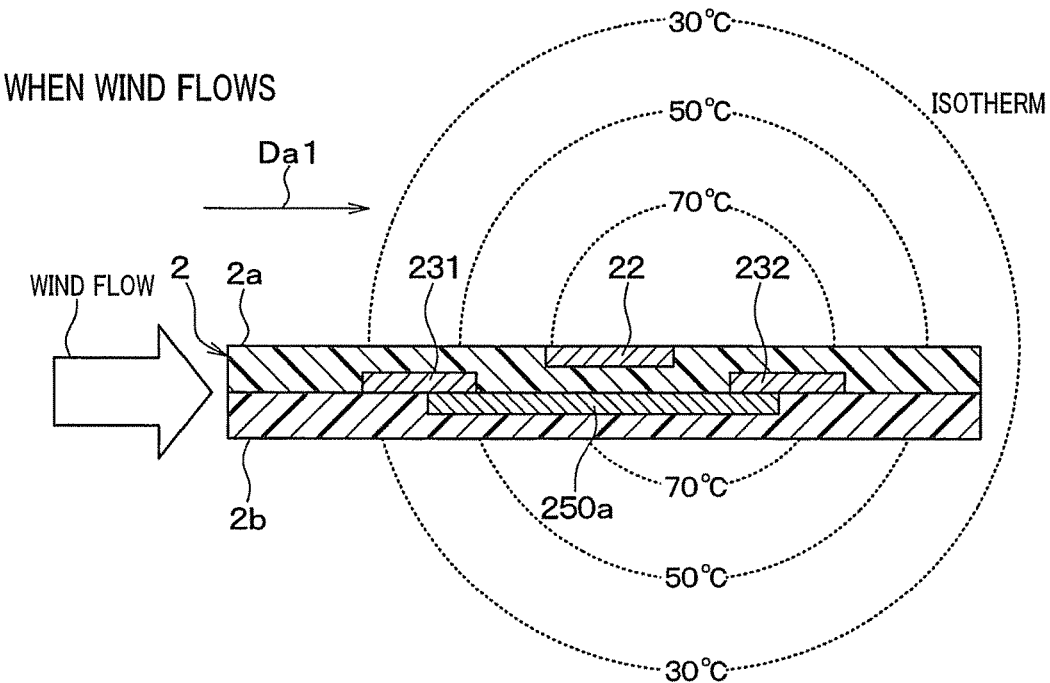
FIG. 36 is a diagram illustrating temperature distribution in the vicinity of the sensor 2 when wind flows, according to Modification 2 of the third embodiment.

When the present sensor 2 is used as well, the first and second connection patterns 231, 232 have no temperature difference therebetween, as shown in FIG. 35, when there is no wind, similarly to the wind direction meter 1 of the aforementioned embodiment, and when the wind flows, the first and second connection patterns 231, 232 produce a temperature difference therebetween as shown in FIG. 36. Therefore, an electromotive force is produced, and the direction of the wind can be measured.

Fourth Embodiment

Figure 37:
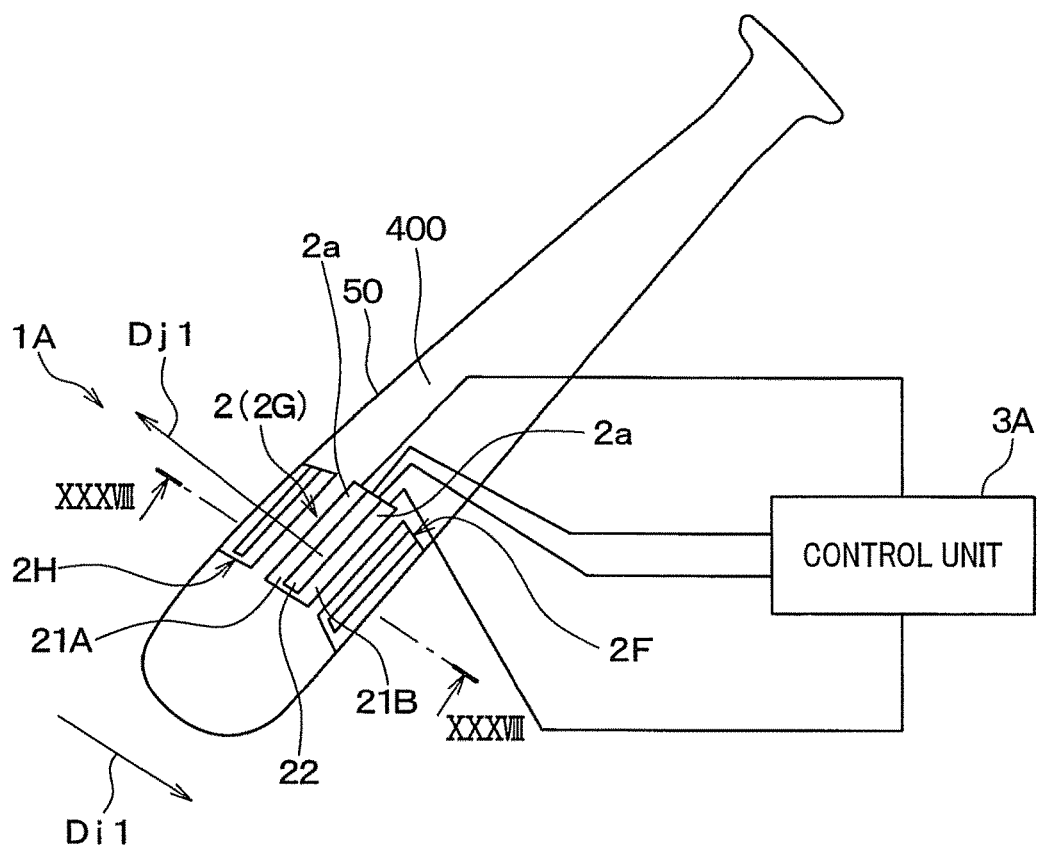
FIG. 37 is a diagram illustrating a general configuration of a movement direction meter 1A (including a bat 50), according to a fourth embodiment.
Figure 38:
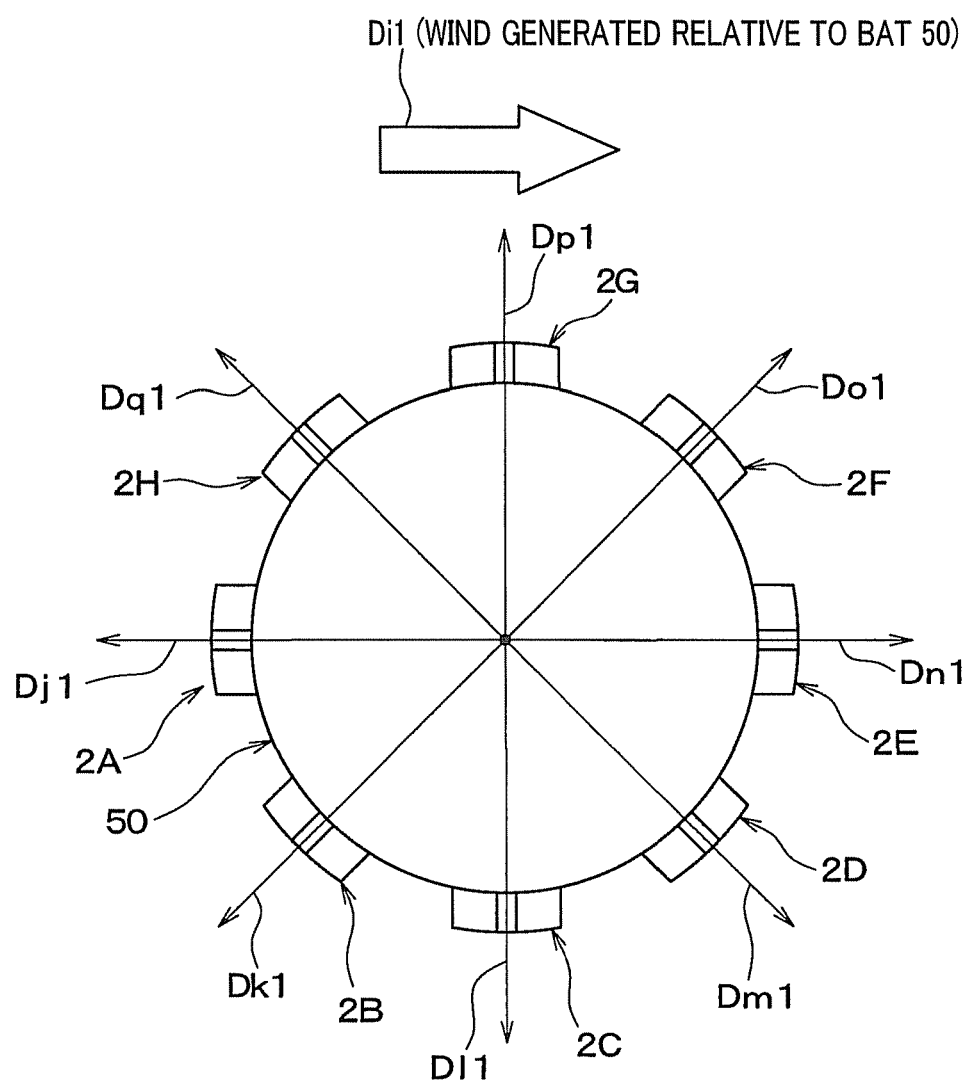
FIG. 38 is a cross-sectional view taken along the line XXXVIII-XXXVIII of FIG. 37.

With reference to FIGS. 37 and 38, hereinafter will be described a movement direction meter 1A for measuring the movement direction of a moving body in the present embodiment. As shown in FIG. 37, the movement direction meter 1A is arranged in a moving body 50, and includes a plurality of sensors 2 and a control unit 3. In the present embodiment, examples of the moving body 50 include a baseball bat, a golf club, a tennis racket, a table tennis racket, movable parts of manufacturing equipment and arm robots, controllers for game machines, and the like. Description herein is provided by way of an example in which the moving body is a baseball bat 50. As shown in FIG. 37, in the present embodiment, a plurality of sensors 2 are adhered onto a surface 400 of the bat 50.

The sensor 2 of the present embodiment has the same structure as that of the sensor 2 of the first embodiment. As shown in FIGS. 37 and 38, each sensor 2 is fixed to the bat 50 so that a first thermoelectric conversion element 21A and a second thermoelectric conversion element 21B are positioned on both sides of a heater 22 in a direction parallel to the movement direction of the bat 50 (e.g., the direction of Dj1). The wiring electrically connecting the sensor 2 to the control unit 3 may better be arranged so as not to be obstructive such as by winding the wiring about the bat 50, or boring a hole into the bat 50 and passing the wiring through the hole for placement inside the bat 50.

Referring now to FIG. 38, hereinafter is described a method of measuring a movement direction of the bat 50 using the movement direction meter 1A of the present embodiment. When seen from the viewpoint of the bat 50, a movement of the bat 50 creates a situation similar to the situation where the wind flows in the direction opposite to the direction of the movement of the bat 50. Namely, a movement of the bat 50 creates a situation similar to the situation where the wind flows in the direction opposite to the direction of the movement in a resting bat 50. For example, as shown in FIG. 37, movement of the bat 50 in the direction of Dj1 creates a situation similar to the situation where the wind flows in a direction of Di1 which is opposite to the direction of Dj1. Therefore, by measuring the direction of the wind in question, the movement direction of the bat 50 can be measured. Accordingly, the movement direction of the bat 50 can be measured based on the same concept as that of the method of measuring the direction of the wind using the wind direction meters 1 described in the first to third embodiments. Thus, the movement direction meter 1A of the present embodiment measures the wind generated relative to the bat 50 above the first surface 2a when the bat 50 is moved to thereby measure the movement direction of the bat 50.

For example, as shown in FIG. 38, the movement direction meter 1A may include a plurality of sensors 2 (sensors 2A to 2H shown in the figure) so as to be able to measure the directions corresponding to a plurality of different directions (8 directions Dj1 to Dq1 herein) in which the bat 50 is likely to move. For example, for the sensor 2G, the direction of the wind which is produced relatively when the bat 50 is moved in the direction of the arrow Dj1 of FIG. 38 is in a direction parallel to the first surface 2a, but is not parallel to the first surface 2a for other sensors 2A to 2F and 2H. Therefore, when the bat 50 is moved in the direction of the arrow Dj1, the sensor 2G generates an electromotive force with a maximum absolute value among the plurality of sensors 2. In this case, the sensor 2G produces a positive electromotive force. In short, the movement direction meter 1A of the present embodiment specifies a sensor 2 that has generated an electromotive force with a positive polarity and with a maximum absolute value from among the plurality of sensors 2 to thereby specify the direction of the wind (the direction of Dj1 when the electromotive force of the sensor 2G is positive and maximum), and further measure the movement direction of the bat 50 (the direction of Di1 when the electromotive force of the sensor 2G is positive and maximum).

The control unit 3A is the movement direction calculation unit for calculating the movement direction of a moving body, as an object to be measured, on the basis of the detection result of each sensor 2. The control unit 3A is an electronic control unit configured, for example, by a microcomputer, a memory as a storage section, and a peripheral circuit. The control unit 3A functions to control the activation and deactivation of the heater 22. The control unit 3A calculates the movement direction of the bat 50 on the basis of the difference in the value of electromotive force generated in each of the plurality of sensors 2.

Other Embodiments

The present invention should not be limited to the aforementioned embodiments, but may be appropriately modified as described below within the range recited in the claims.

For example, the position of the heater 22 may be changed in the sensor 2 of the first embodiment. In the first embodiment, the heater 22 has been positioned in the center part in a direction perpendicular to the first surface 2a and the second surface 2b of the sensor 2, but the heater 22 may be positioned on the first surface 2a of the sensor 2. Namely, for example, the heater 22 may be configured by a resistor which generates heat with an application of current, and the resistor may be provided to the front surface protective member 24, being exposed therefrom.

Further, a windshield may be provided between the plurality of sensors 2 in the wind direction meters 1 of the first to third embodiments and the movement direction meter 1A of the fourth embodiment. In this case, the generation of a Karman vortex can be prevented on the leeward side of the sensor 2, and thus the direction of the wind or the movement direction of a moving body can be measured with a high accuracy.

Further, the wind direction meters 1 of the first to third embodiments measure the direction of the wind, as an object to be measured, on the basis of the difference in electromotive force generated in each of the plurality of sensors 2, and similarly, the movement direction of a moving body (the bat) 50 is measured on the basis of the difference in the value of electromotive force generated in each of the plurality of sensors 2 in the movement direction meter 1A of the fourth embodiment. However, the direction of the wind and the movement direction of the moving body 50 may be measured on the basis of the difference in current, instead of voltage, in the first to fourth embodiments. Namely, the wind direction meter 1 and the movement direction meter 1A of the present invention can calculate the direction of the wind and the movement direction of the moving body 50 on the basis of the difference in electrical output of either the voltage or the current generated in each of the plurality of sensors 2.

There is a fixed relationship between the temperature difference and the volume of the wind, the temperature difference occurring at the first ends 21aa, 21ba, 250aa, 250ba and the second ends 21ab, 21bb, 250ab, 250bb of the first and second conductors (the first and second interlayer connection members 21a, 21b, P- and N-type elements 250a, 250b) in the wind direction meters 1 of the first to third embodiments. Namely, there is a fixed relationship between the value of electromotive force generated by the sensor 2 in conformity with the temperature difference and the volume of the wind. Therefore, this relationship can be used for providing a wind direction/flow meter in which a flow meter is configured by the wind direction meter 1 of the first to third embodiments to measure the wind volume on the basis of the value of the electromotive force outputted from the sensor 2. Namely, the wind volume may be ensured to be calculated in the control units 3 of the first to third embodiments, on the basis of the value of the electromotive force outputted from the sensor 2 and the relationship of the value of the electromotive force with the wind volume. In this case, specifically, for example, a sensor 2 having positive polarity and generating an electromotive force with a maximum absolute value is ensured to be specified from among the plurality of sensors 2, for calculation of the wind volume on the basis of the value of the electromotive force generated by the specified sensor 2. Further, in this case, a sensor 2 having negative polarity and generating an electromotive force with a maximum absolute value is ensured to be specified from among the plurality of sensors 2, for consideration of the value of the electromotive force generated by the specified sensor 2. The relationship of the electromotive force outputted from the sensor 2 with the wind volume may be obtained in advance by experiments or the like and stored in the memory of the control unit 3 in advance.

Figure 39:
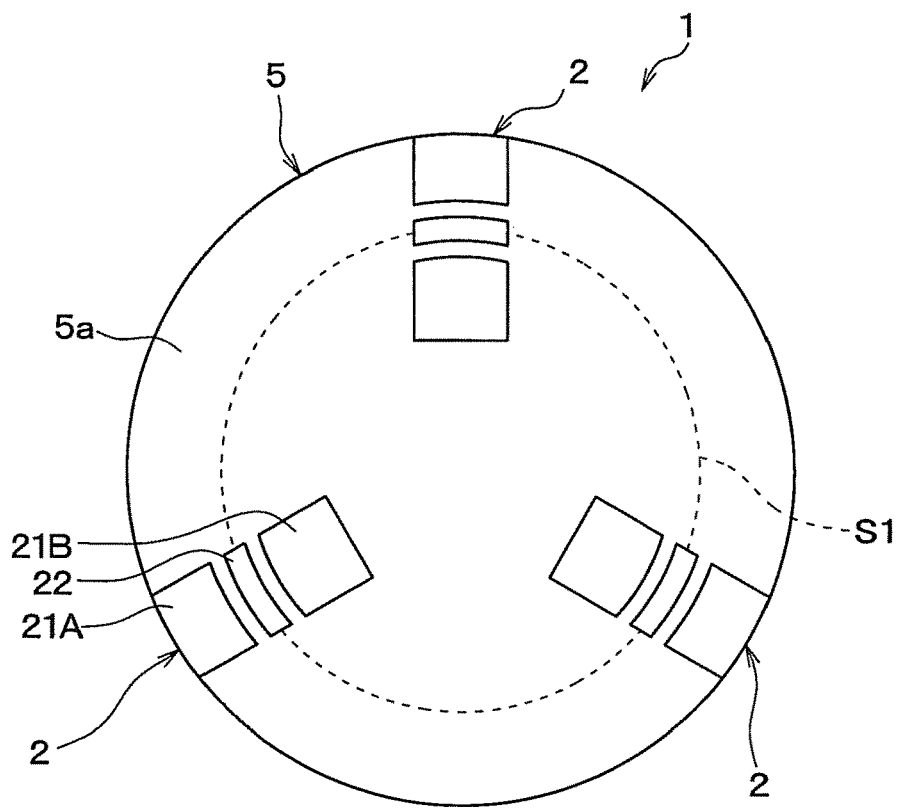
FIG. 39 is a plan view illustrating a wind direction meter 1, according to another embodiment.

Further, the wind direction meters 1 of the first to third embodiments have a configuration provided with eight sensors 2, but the number of sensors 2 is not limited to this. For example, as shown in FIG. 39, the wind direction meter 1 may have a configuration provided with three sensors 2. In this way, the number of sensors 2 is not limited to even numbers, but may be an odd number. Further, in the wind direction meters 1 of the first to third embodiments, the plurality of sensors 2 are disposed at even intervals on the circumference S1, but the plurality of sensors 2 do not have to be disposed at even intervals.

Further, the wind direction meters 1 of the first to third embodiments use eight sensors 2 to measure the wind in eight directions (8 azimuths), but the number of sensors 2 in the wind direction meter 1 and the number of wind directions measured by the wind direction meter 1 can be changed as desired. In the wind direction meters 1 of the first to third embodiments, the control unit 3 calculates the wind direction on the basis of the outputs from the plurality of sensors 2 and the relationship of the outputs with the respective 8 azimuths. This can specify as to which of the 8 azimuths the wind direction in question corresponds to.

The output of the plurality of sensors 2 arranged in the plane 5a each depend on the wind direction. Thus, the control unit 3 may be configured to calculate the wind direction on the basis of the outputs of the plurality of sensors 2, and the relationship of all the wind directions to be specified with the outputs of the plurality of sensors 2. This can specify as to which of the plurality of directions the wind direction desired to be specified corresponds to. For example, the wind direction is calculated on the basis of the outputs of the plurality of sensors 2, and the relationship of the wind directions to 360 azimuths with the outputs of the plurality of sensors 2. This can specify as to which of the 360 azimuths the wind direction in question corresponds to. Namely, the wind in every direction can be specified.

Figure 40:
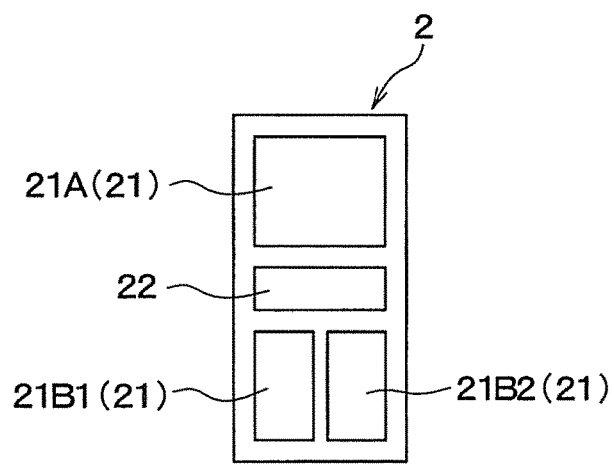
FIG. 40 is a plan view illustrating a sensor 2, according to another embodiment.
Figure 41:
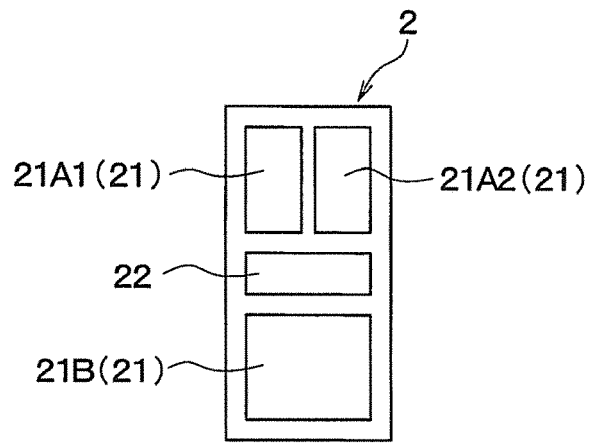
FIG. 41 is a plan view illustrating a sensor 2, according to another embodiment.
Figure 42:
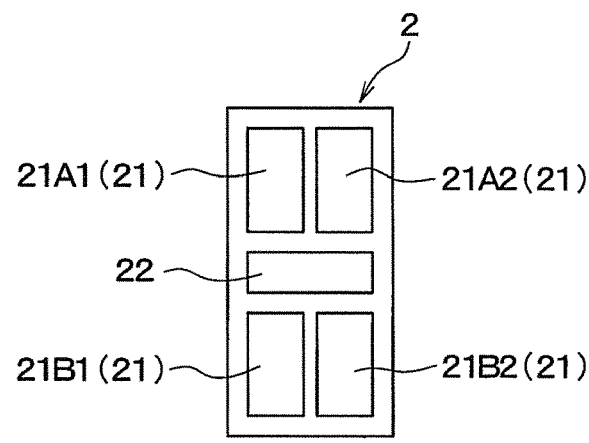
FIG. 42 is a plan view illustrating a sensor 2, according to another embodiment.

Further, in the wind direction meter 1 of the first embodiment, as shown in FIGS. 1 and 2, each sensor 2 is configured such that a thermoelectric conversion element 21A and a thermoelectric conversion element 21B are disposed to sandwich the heater 22, but other configurations may be used. For example, as shown in FIG. 40, each sensor 2 may be configured such that a thermoelectric conversion element 21A is disposed on one side of the heater 22 (upper side of the figure) and two thermoelectric conversion elements 21B1, 21B2 are disposed on the other side (lower side of the figure). Alternatively, as shown in FIG. 41, two thermoelectric conversion elements 21A1, 21A2 may be disposed on one side of the heater 22, and a thermoelectric conversion element 21B may be disposed on the other side. Alternatively, as shown in FIG. 42, two thermoelectric conversion elements 21A1, 21A2 may be disposed on one side of the heater 22 and two thermoelectric conversion elements 21B1, 21B2 may be disposed on the other side. Thus, the number of thermoelectric conversion elements 21 disposed on one side and the other side of the heater 22 may be changed as desired. Similarly, in the wind direction meter 1 of the second embodiment as well, the number of thermoelectric conversion elements 21 disposed on one side and the other side of the Peltier element 320 may be changed as desired. It should be noted that a thermoelectric conversion element 21 referred to herein is configured so that the first interlayer connection member 21a and the second interlayer connection member 21b are serially connected.

Figure 43:
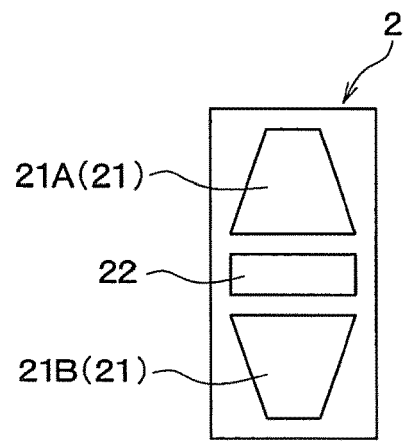
FIG. 43 is a plan view illustrating a sensor 2, according to another embodiment.
Figure 44:
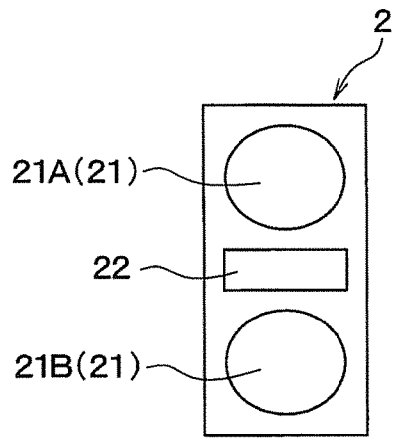
FIG. 44 is a plan view illustrating a sensor 2, according to another embodiment.
Figure 45:
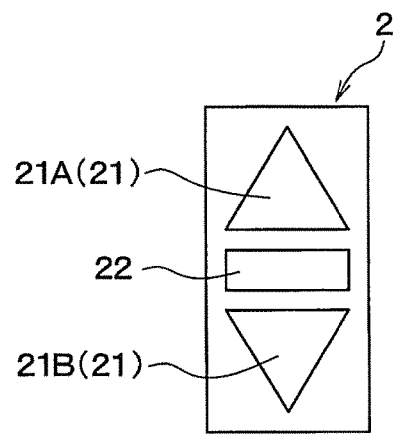
FIG. 45 is a plan view illustrating a sensor 2, according to another embodiment.
Figure 46:
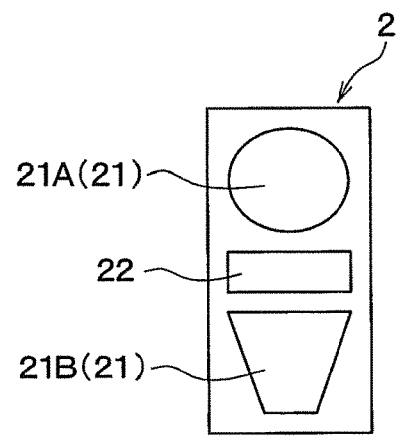
FIG. 46 is a plan view illustrating a sensor 2, according to another embodiment.

Further, in the wind direction meter 1 of the first embodiment, as shown in FIG. 2, the two thermoelectric conversion elements 21A, 21B disposed sandwiching the heater 22 are in a rectangular shape, but they may be in other shapes. For example, the two thermoelectric conversion elements 21A, 21B may each be in a trapezoidal shape as shown in FIG. 43, a circular shape as shown in FIG. 44, or a triangular shape as shown in FIG. 45. Alternatively, the two thermoelectric conversion elements 21A, 21B do not have to be in the same shape, but may be in different shapes as shown in FIG. 46. The shape of the thermoelectric conversion element 21 refers to the shape of the region for forming the thermoelectric conversion element 21. Namely, when a line is drawn along the first and second interlayer connection members 21a, 21b positioned in the outer periphery so as to enclose all the first and second interlayer connection members 21a, 21b in the region where the first and second interlayer connection members 21a, 21b are formed, the shape formed by the line is the shape of the region for forming the thermoelectric conversion element 21. The same applies to the wind direction meter 1 of the second embodiment.

REFERENCE SIGNS LIST 2 sensor
21aa first end of first interlayer connection member
21ab second end of first interlayer connection member
21ba first end of second interlayer connection member
21bb send end of second interlayer connection member
22 heater
250aa first end of P-type element
250ab second end of P-type element
250ba first end of N-type element
250bb second end of N-type element
3 control unit
320 Peltier element

What is claimed is:

1. A wind direction meter having a first surface and measuring a direction of a wind flowing above the first surface, comprising:
   a plurality of sensors each formed with the first surface and provided with:
   at least first and second thermoelectric conversion elements, each of the first and second thermoelectric conversion elements:
      having a first conductor that has a first end and a second end opposite to the first end made of a metal or a semiconductor, and
      having a second conductor that has a first end and a second end opposite to the first end made of a metal or a semiconductor different from the first conductor,
      the first conductor and the second conductor being serially connected to each other,
   each of the first and second thermoelectric conversion elements generating an electrical output when a temperature difference occurs between:
      the first end of each of the first and second conductors, which is connected to the first end of the other of the first and second conductors, and
      the second end of the corresponding one of the first conductor and the second conductor; and
   a temperature changing unit for changing an ambient temperature by conducting at least one of heat generation and heat absorption,
   wherein: when the surrounding air, whose temperature has been changed by the temperature changing unit, is moved by the wind to cause a temperature difference between the first end and the second end of each of the first conductor and the second conductor, the output generated by each of the first and second thermoelectric conversion elements being in conformity with the temperature difference; and the outputs, which are generated by the respective first and second thermoelectric conversion elements when the wind flows in a predetermined direction, have values different from each other; and a wind direction calculation unit for calculating a direction of the wind on the basis of a difference between the values of the outputs generated in each of the plurality of sensors, wherein each of the sensors has a configuration in which the first and second thermoelectric conversion elements are disposed sandwiching the temperature changing unit, while being serially connected to each other via wiring, the first and second thermoelectric conversion elements having a configuration that the first and second thermoelectric conversion elements are opposite to each other in terms of correspondence relation between the output polarity and the temperature difference between the first end and the second end of each of the first conductor and the second conductor, and wherein the configuration of the first and second thermoelectric conversion elements:

causes, when there is no wind, the first and second thermoelectric conversion elements to generate, as the respective outputs, respective electromotive forces that have equivalent magnitudes and have reversed polarities if the first end of each of the first and second thermoelectric conversion elements is higher or lower in temperature than the second end of the corresponding one of the first and second thermoelectric conversion elements; and causes, when the surrounding air, whose temperature has been changed by the temperature changing unit, is moved by the wind to cause the temperature difference between the first end and the second end of each of the first conductor and the second conductor, the first and second thermoelectric conversion elements to generate respective electromotive forces that have identical polarities.

2. The wind direction meter according to claim 1, wherein:

the first end of each of the first conductor and the second conductor is disposed on the first surface side, while the second end of each of the first conductor and the second conductor is disposed on a second surface side opposite to the first surface; and the temperature changing unit is configured by a first temperature changing unit disposed on the first surface side to conduct heat generation or heat absorption, and a second temperature changing unit disposed on the second surface side to conduct heat generation or heat absorption that is not being conducted by the first temperature changing unit.

3. The wind direction meter according to claim 1, wherein the first end of each of the first conductor and the second conductor is configured to be disposed upstream of the wind in a direction in which the wind flows, and the second end of each of the first conductor and the second conductor is configured to be disposed downstream of the wind.

4. A wind direction/flow meter, comprising:

the wind direction meter according to claim 1, wherein:

the wind direction calculation unit also configures a flow meter for calculating a wind volume on the basis of the values of the outputs.

5. A movement direction meter having a first surface and arranged in a moving body to measure a movement direction of the moving body by measuring a wind generated relative to the moving body, the wind being generated above the first surface when the moving body moves, comprising:

a plurality of sensors each formed with the first surface and provided with:

at least first and second thermoelectric conversion elements, each of the first and second thermoelectric conversion elements:

having a first conductor that has a first end and a second end opposite to the first end made of a metal or a semiconductor, and having a second conductor that has a first end and a second end opposite to the first end made of a metal or a semiconductor different from the first conductor, the first conductor and the second conductor being serially connected to each other, each of the first and second thermoelectric conversion elements generating an electrical output when a temperature difference occurs between:

the first end of each of the first and second conductors, which is connected to the first end of the other of the first and second conductors, and the second end of the corresponding one of the first conductor and the second conductor; and a temperature changing unit for changing an ambient temperature by performing at least one of heat generation and heat absorption, wherein: when the surrounding air, whose temperature has been changed by the temperature changing unit, is moved by the wind to cause a temperature difference between the first end and the second end of each of the first conductor and the second conductor, the output generated by each of the first and second thermoelectric conversion elements being in conformity with the temperature difference; and the outputs, which are generated by the respective first and second thermoelectric conversion elements when the wind flows in a predetermined direction, have values different from each other; and a movement direction calculation unit for calculating a movement direction of the moving body on the basis of a difference between the values of the outputs generated in each of the plurality of sensors, wherein each of the sensors has a configuration in which the first and second thermoelectric conversion elements are disposed sandwiching the temperature changing unit, while being serially connected to each other via wiring, the first and second thermoelectric conversion elements having a configuration that the first and second thermoelectric conversion elements are opposite to each other in terms of correspondence relation between the output polarity and the temperature difference between the first end and the second end of each of the first conductor and the second conductor, and wherein the configuration of the first and second thermoelectric conversion elements:

causes, when there is no wind, the first and second thermoelectric conversion elements to generate, as the respective outputs, respective electromotive forces that have equivalent magnitudes and have reversed polarities if the first end of each of the first and second thermoelectric conversion elements is higher or lower in temperature than the second end of the corresponding one of the first and second thermoelectric conversion elements; and causes, when the surrounding air, whose temperature has been changed by the temperature changing unit, is moved by the wind to cause the temperature difference between the first end and the second end of each of the first conductor and the second conductor, the first and second thermoelectric conversion elements to generate respective electromotive forces that have identical polarities.

6. A wind direction meter having a first surface and measuring a direction of a wind flowing above the first surface, comprising:

a plurality of sensors each formed with the first surface and provided with:

a thermoelectric conversion element:

having a first conductor that has a first end and a second end opposite to the first end made of a metal or a semiconductor, and having a second conductor that has a first end and a second end opposite to the first end made of a metal or a semiconductor different from the first conductor, the first conductor and the second conductor being serially connected to each other, and the first ends disposed on a mutually connected side of the first conductor and the second conductor, and the second end of the first conductor, and the second end of the second conductor generating electrical outputs when a temperature difference occurs; and a temperature changing unit for changing an ambient temperature by conducting at least one of heat generation and heat absorption, wherein: when the surrounding air, whose temperature has been changed by the temperature changing unit, is moved by the wind to cause a temperature difference between the first end and the second end of the respective first conductor and the second conductor, the outputs are ensured to be generated in conformity with the temperature difference; and the outputs, which are generated when the wind flows in a predetermined direction, have values different from each other; and a wind direction calculation unit for calculating a direction of the wind on the basis of a difference between the values of the outputs generated in each of the plurality of sensors, wherein the first end of each of the first conductor and the second conductor is disposed on the first surface side, while the second end of each of the first conductor and the second conductor is disposed on a second surface side opposite to the first surface; and the temperature changing unit is configured by a first temperature changing unit disposed on the first surface side to conduct heat generation or heat absorption, and a second temperature changing unit disposed on the second surface side to conduct heat generation or heat absorption that is not being conducted by the first temperature changing unit.

7. The wind direction meter according to claim 6, wherein the first end of each of the first conductor and the second conductor is configured to be disposed upstream of the wind in a direction in which the wind flows, and the second end of each of the first conductor and the second conductor is configured to be disposed downstream of the wind.

* * * * *